US012238696B2

(12) United States Patent
Tian et al.

(10) Patent No.: US 12,238,696 B2
(45) Date of Patent: Feb. 25, 2025

(54) JOINT HARQ TIMING AND SLIV DESIGN FOR MULTI-PDSCH GRANT

(71) Applicant: QUALCOMM Incorporated, San Diego, CA (US)

(72) Inventors: Qingjiang Tian, San Diego, CA (US); Jing Sun, San Diego, CA (US); Xiaoxia Zhang, San Diego, CA (US); Zhifei Fan, San Diego, CA (US); Tao Luo, San Diego, CA (US); Wooseok Nam, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 699 days.

(21) Appl. No.: 17/452,346

(22) Filed: Oct. 26, 2021

(65) Prior Publication Data

US 2022/0150907 A1    May 12, 2022

Related U.S. Application Data

(60) Provisional application No. 63/110,793, filed on Nov. 6, 2020.

(51) Int. Cl.
*H04W 72/12* (2023.01)
*H04L 5/00* (2006.01)
*H04W 72/23* (2023.01)

(52) U.S. Cl.
CPC .......... *H04W 72/12* (2013.01); *H04L 5/0078* (2013.01); *H04W 72/23* (2023.01)

(58) Field of Classification Search
None
See application file for complete search history.

(56) References Cited

U.S. PATENT DOCUMENTS

2022/0159652 A1*  5/2022  Bae .................. H04W 72/0446
2023/0006798 A1*  1/2023  Lee ...................... H04L 1/1607
(Continued)

FOREIGN PATENT DOCUMENTS

WO    WO2018174766    *  9/2018

OTHER PUBLICATIONS

International Search Report and Written Opinion—PCT/US2021/072054—ISA/EPO—Feb. 25, 2022.
(Continued)

*Primary Examiner* — Mohammad S Adhami
(74) *Attorney, Agent, or Firm* — Harrity & Harrity, LLP

(57) ABSTRACT

Various aspects of the present disclosure generally relate to wireless communication. In some aspects, a user equipment (UE) may receive a grant that schedules multiple downlink communications, wherein the grant includes multiple start and length indicator values (SLIVs) that indicate respective time domain resource allocations (TDRAs) for the multiple downlink communications and a feedback timing indicator that indicates timing of uplink feedback communications for the multiple downlink communications. The UE may determine that there is a conflict between a timing of a first uplink feedback communication for a first downlink communication of the multiple downlink communications and a TDRA for a second downlink communication of the multiple downlink communications. The UE may adjust at least one of the TDRA for the second downlink communication or the timing of the first uplink feedback communication. Numerous other aspects are provided.

29 Claims, 14 Drawing Sheets

(56) References Cited

U.S. PATENT DOCUMENTS

| | | | |
|---|---|---|---|
| 2023/0007651 A1* | 1/2023 | Shi | H04W 72/0446 |
| 2023/0189287 A1* | 6/2023 | Gao | H04L 5/0098 370/329 |

OTHER PUBLICATIONS

Mediatek Inc, et al., "Timing Relationship Enhancements for NR-NTN", 3GPP Draft, R1-2008808, 3GPP TSG RAN WG1 Meeting #103e, 3rd Generation Partnership Project (3GPP), Mobile Competence Centre, 650, Route Des Lucioles, F-06921 Sophia-Antipolis Cedex, France, vol. Ran WG1, No. Oct. 26, 2020-Nov. 13, 2020, Oct. 23, 2020 (Oct. 23, 2020), XP051945372, 6 pages, Retrieved from the Internet: URL: https://ftp.3gpp.org/tsg_ran/WG1_RL1/TSGR1_103-e/Docs/R1-2008808.zip R1-2008808-MediaTek-Timing relationship enhancements for NR-NTN.docx [retrieved on Oct. 23, 2020] the whole document.

Vivo: "Discussion on Joint Scheduling", 3GPP Draft, R1-2006987, 3GPP TSG RAN WG1 #102, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 14, 2020 (Aug. 14, 2020), XP051920687, 8 Pages, Retrieved from the Internet: URL: https://ftp.3gpp.org/tsg_ran/WG1_RL1/TSGR1_102-e/Docs/R1-2006987.zip R1-2006987 Discussion on joint scheduling.docx [retrieved on Aug. 14, 2020] the whole document.

Vivo: "HARQ-ACK Enhancements for Rel-17 URLLC", 3GPP Draft, R1-2007655, 3GPP TSG RAN WG1#103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946461, 7 Pages, Retrieved from the Internet: URL: https://ftp.3gpp.org/tsg_ran/WG1_RL1/TSGR1_103-e/Docs/R1-2007655.zip R1-2007655-HARQ-ACK enahncements forRel-17 URLLC.docx [retrieved on Oct. 24, 2020] the whole document, Section 2.1.1 "Avoiding SPS HARQ-ACK dropping for TDD", pp. 1-4, figures 1-4, Section 2.2 "Retransmisison of cancelled HARQ-ACK", pp. 5,6.

* cited by examiner

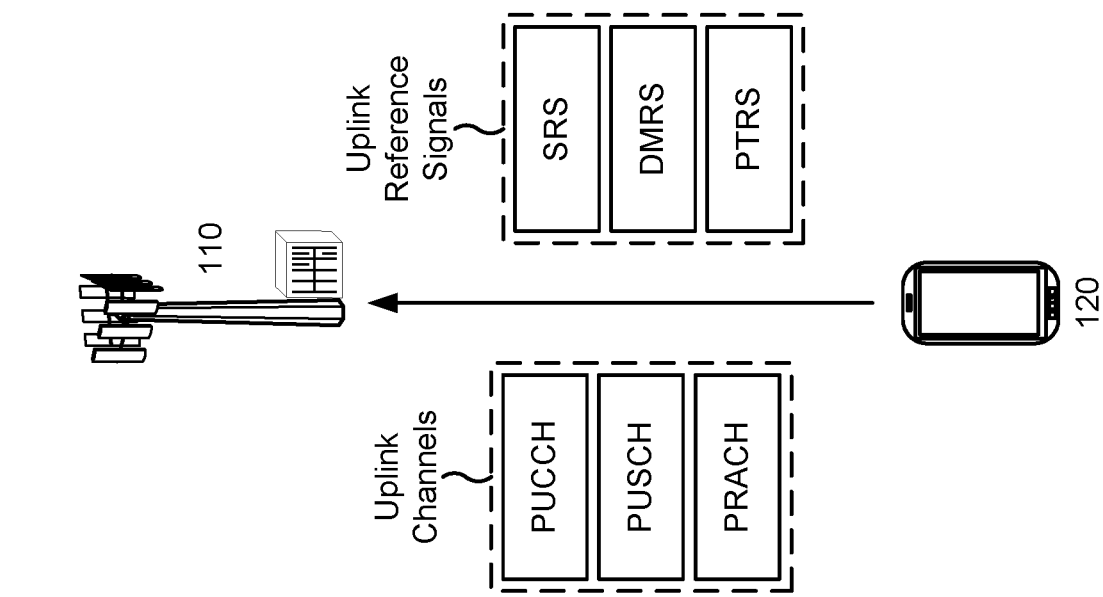
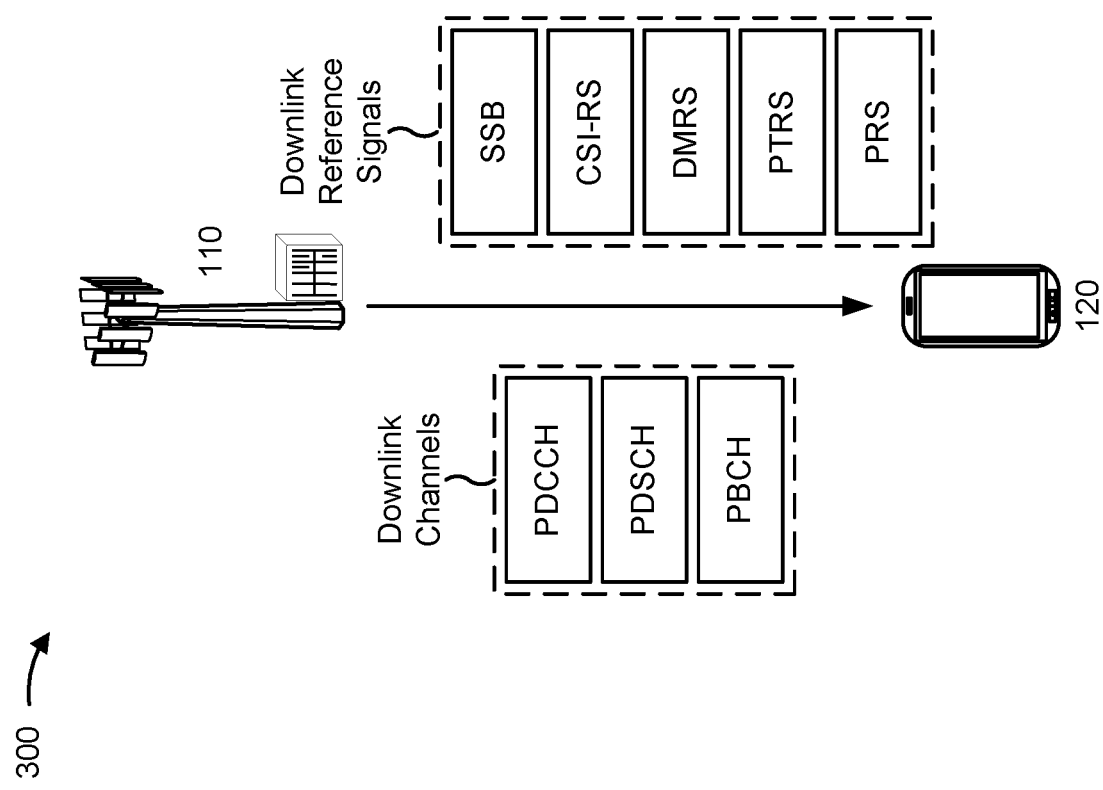
FIG. 3

JOINT HARQ TIMING AND SLIV DESIGN FOR MULTI-PDSCH GRANT

CROSS-REFERENCE TO RELATED APPLICATION

This patent application claims priority to U.S. Provisional Patent Application No. 63/110,793, filed on Nov. 6, 2020, entitled "JOINT HARQ TIMING AND SLIV DESIGN FOR MULTI-PDSCH GRANT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for joint hybrid automatic repeat request (HARQ) timing and start and length indicator value (SLIV) design for multiple physical downlink shared channel (multi-PDSCH) grant.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a grant that schedules multiple downlink communications, wherein the grant includes multiple start and length indicator values (SLIVs) that indicate respective time domain resource allocations (TDRAs) for the multiple downlink communications and a feedback timing indicator that indicates timing of uplink feedback communications for the multiple downlink communications; determining, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and adjusting at least one of the TDRA for the second downlink communication or the timing of the first uplink feedback communication based at least in part on determining that there is a conflict between the timing of the first uplink feedback communication and the TDRA for the second downlink communication.

In some aspects, a method of wireless communication performed by a base station includes transmitting, to a UE, a grant that schedules multiple downlink communications, wherein the grant includes multiple SLIVs that indicate respective TDRAs for the multiple downlink communications and a feedback timing indicator that indicates timing of uplink feedback communications for the multiple downlink communications; determining, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and transmitting, to the UE, the second downlink communication in an adjusted TDRA based at least in part on determining that there is a conflict between the timing of the first uplink feedback communication and the TDRA for the second downlink communication.

In some aspects, a method of wireless communication performed by a base station includes determining SLIVs to configure a TDRA for transmitting multiple downlink communications in respective slots of a plurality of slots, wherein the TDRA leaves a gap comprising one or more symbols at an end of each slot in the plurality of slots; determining a feedback offset timing indicator to configure an uplink feedback communication for one or more of the multiple downlink communications to be scheduled in the gap at the end of a slot in the plurality of slots; and transmitting, to a UE, a grant that schedules the multiple downlink communications, wherein the grant includes the SLIVs and the feedback offset timing indicator.

In some aspects, a UE for wireless communication includes a memory and one or more processors coupled to the memory, the one or more processors configured to: receive a grant that schedules multiple downlink communications, wherein the grant includes multiple SLIVs that indicate respective TDRAs for the multiple downlink communications and a feedback timing indicator that indicates timing of uplink feedback communications for the multiple downlink communications; determine, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and adjust at least one of the TDRA for the second downlink communication or the timing of the first uplink feedback communication based at least in part on determining that there is a conflict between the timing of the first uplink feedback communication and the TDRA for the second downlink communication.

In some aspects, a base station for wireless communication includes a memory and one or more processors coupled to the memory, the one or more processors configured to: transmit, to a UE, a grant that schedules multiple downlink communications, wherein the grant includes multiple SLIVs that indicate respective TDRAs for the multiple downlink communications and a feedback timing indicator that indicates timing of uplink feedback communications for the multiple downlink communications; determine, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and transmit, to the UE, the second downlink communication in an adjusted TDRA based at least in part on determining that there is a conflict between the timing of the first uplink feedback communication and the TDRA for the second downlink communication.

In some aspects, a base station for wireless communication includes a memory and one or more processors coupled to the memory, the one or more processors configured to: determine SLIVs to configure a TDRA for transmitting multiple downlink communications in respective slots of a plurality of slots, wherein the TDRA leaves a gap comprising one or more symbols at an end of each slot in the plurality of slots; determine a feedback offset timing indicator to configure an uplink feedback communication for one or more of the multiple downlink communications to be scheduled in the gap at the end of a slot in the plurality of slots; and transmit, to a UE, a grant that schedules the multiple downlink communications, wherein the grant includes the SLIVs and the feedback offset timing indicator.

In some aspects, a non-transitory computer-readable medium storing a set of instructions for wireless communication includes one or more instructions that, when executed by one or more processors of a UE, cause the UE to: receive a grant that schedules multiple downlink communications, wherein the grant includes multiple SLIVs that indicate respective TDRAs for the multiple downlink communications and a feedback timing indicator that indicates timing of uplink feedback communications for the multiple downlink communications; determine, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and adjust at least one of the TDRA for the second downlink communication or the timing of the first uplink feedback communication based at least in part on determining that there is a conflict between the timing of the first uplink feedback communication and the TDRA for the second downlink communication.

In some aspects, a non-transitory computer-readable medium storing a set of instructions for wireless communication includes one or more instructions that, when executed by one or more processors of a base station, cause the base station to: transmit, to a UE, a grant that schedules multiple downlink communications, wherein the grant includes multiple SLIVs that indicate respective TDRAs for the multiple downlink communications and a feedback timing indicator that indicates timing of uplink feedback communications for the multiple downlink communications; determine, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and transmit, to the UE, the second downlink communication in an adjusted TDRA based at least in part on determining that there is a conflict between the timing of the first uplink feedback communication and the TDRA for the second downlink communication.

In some aspects, a non-transitory computer-readable medium storing a set of instructions for wireless communication includes one or more instructions that, when executed by one or more processors of a base station, cause the base station to: determine SLIVs to configure a TDRA for transmitting multiple downlink communications in respective slots of a plurality of slots, wherein the TDRA leaves a gap comprising one or more symbols at an end of each slot in the plurality of slots; determine a feedback offset timing indicator to configure an uplink feedback communication for one or more of the multiple downlink communications to be scheduled in the gap at the end of a slot in the plurality of slots; and transmit, to a UE, a grant that schedules the multiple downlink communications, wherein the grant includes the SLIVs and the feedback offset timing indicator.

In some aspects, an apparatus for wireless communication includes means for receiving a grant that schedules multiple downlink communications, wherein the grant includes multiple SLIVs that indicate respective TDRAs for each of the multiple downlink communications and a feedback timing indicator that indicates timing of uplink feedback communications for the multiple downlink communications; means for determining, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and means for adjusting at least one of the TDRA for the second downlink communication or the timing of the first uplink feedback communication based at least in part on determining that there is a conflict between the timing of the first uplink feedback communication and the TDRA for the second downlink communication.

In some aspects, an apparatus for wireless communication includes means for transmitting, to a UE, a grant that schedules multiple downlink communications, wherein the grant includes multiple SLIVs that indicate respective TDRAs for the multiple downlink communications and a feedback timing indicator that indicates timing of uplink feedback communications for the multiple downlink communications; means for determining, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and means for transmitting, to the UE, the second downlink communication in an adjusted TDRA based at least in part on determining that there is a conflict between the timing of the first uplink feedback communication and the TDRA for the second downlink communication.

In some aspects, an apparatus for wireless communication includes means for determining SLIVs to configure a TDRA for transmitting multiple downlink communications in respective slots of a plurality of slots, wherein the TDRA leaves a gap comprising one or more symbols at an end of each slot in the plurality of slots; means for determining a feedback offset timing indicator to configure an uplink feedback communication for one or more of the multiple downlink communications to be scheduled in the gap at the end of a slot in the plurality of slots; and means for transmitting, to a UE, a grant that schedules the multiple downlink communications, wherein the grant includes the SLIVs and the feedback offset timing indicator.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3 is a diagram illustrating an example of physical channels and reference signals in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
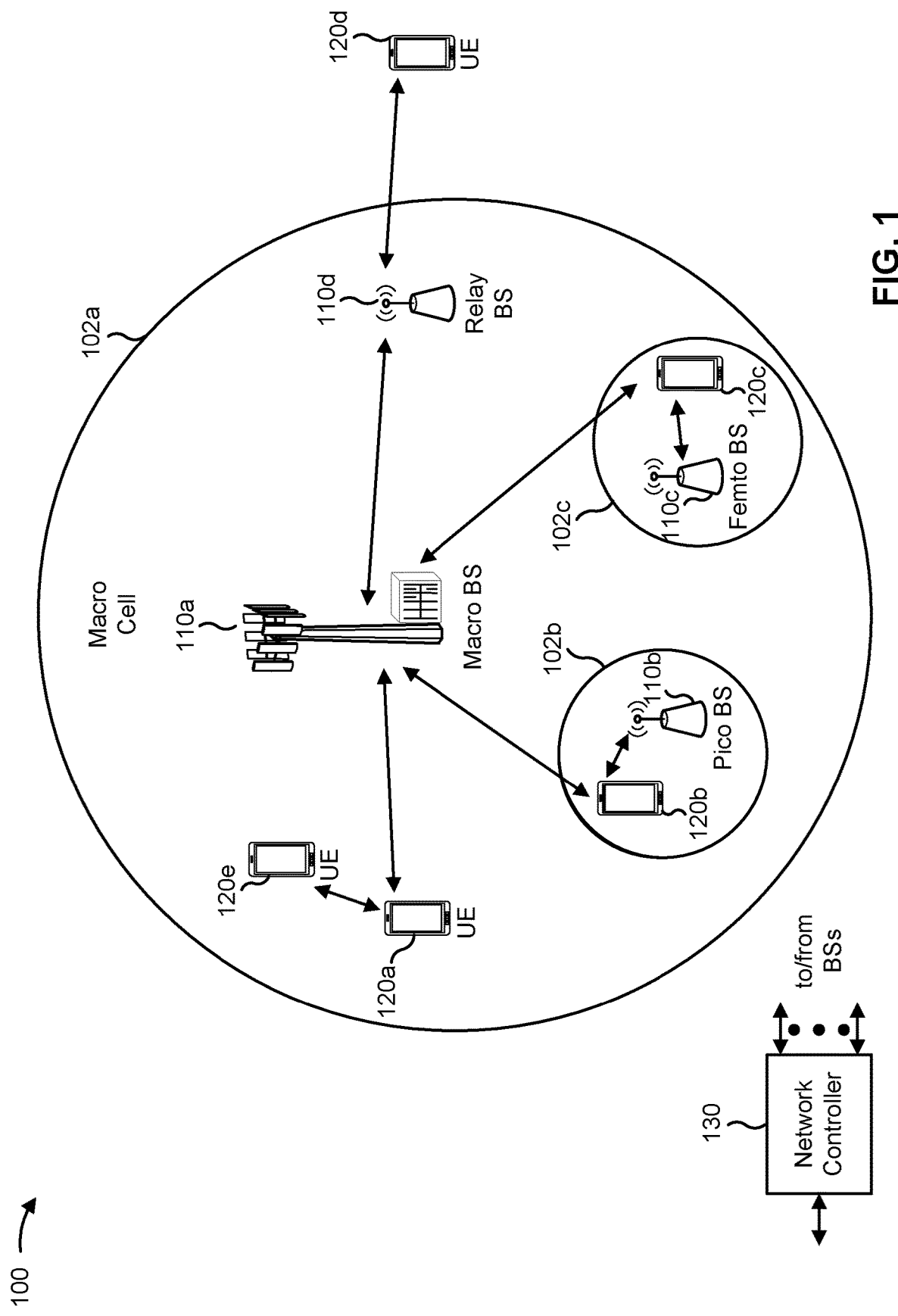
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
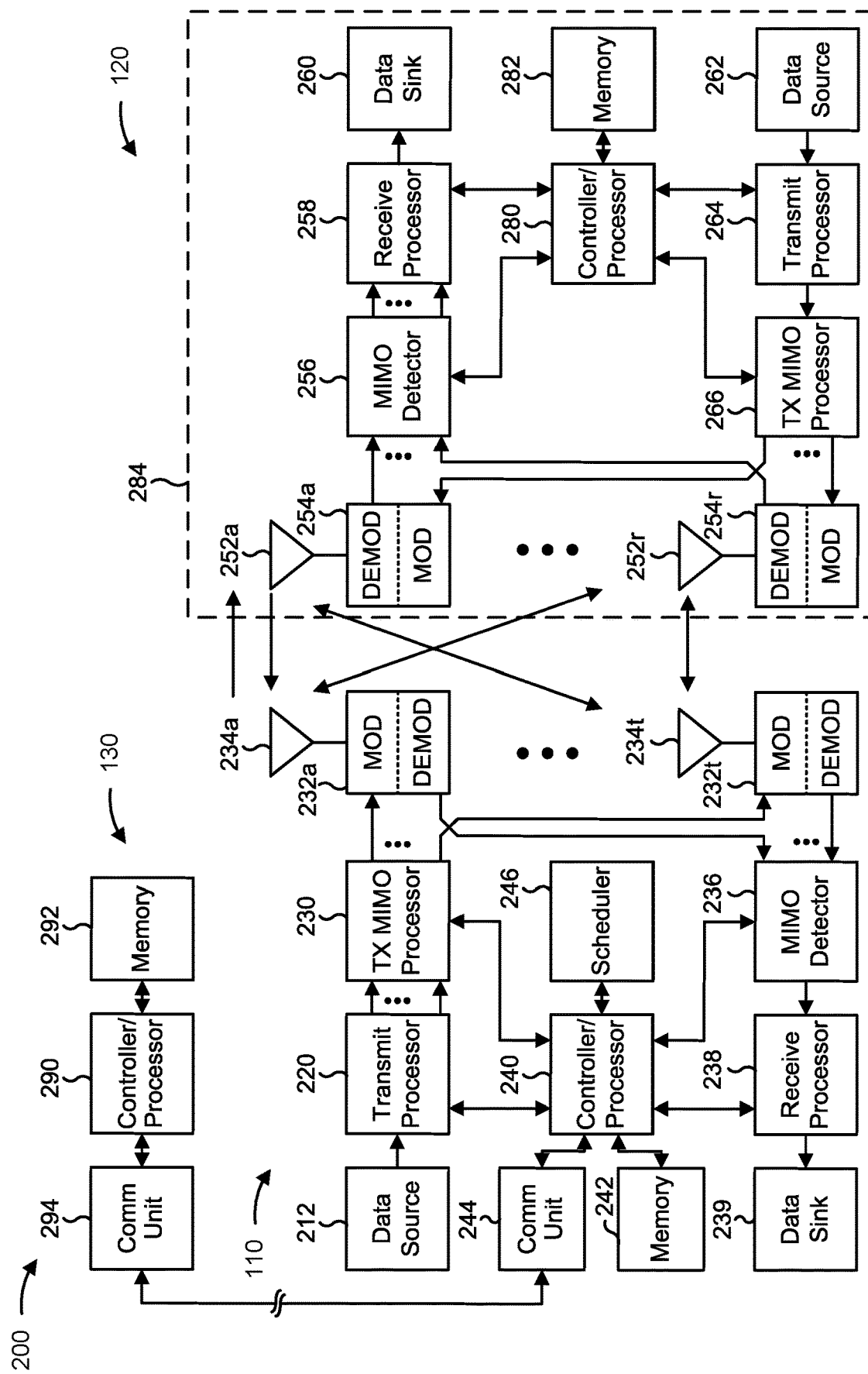
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-12).

Controller/processor 240 of base station 110, controller/processor 280 of UE 120, and/or any other component(s) of FIG. 2 may perform one or more techniques associated with joint hybrid automatic repeat request (HARQ) timing and start and length indicator value (SLIV) design for multiple physical downlink shared channel (multi-PDSCH) grant, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, the UE 120 includes means for receiving a grant that schedules multiple downlink communications, wherein the grant includes multiple SLIVs that indicate respective time domain resource allocations (TDRAs) for each of the multiple downlink communications and a feedback timing indicator that indicates timing of uplink feedback communications for the multiple downlink communications; means for determining, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and/or means for adjusting at least one of the TDRA for the second downlink communication or the timing of the first uplink feedback communication based at least in part on determining that there is a conflict between the timing of the first uplink feedback communication and the TDRA for the second downlink communication. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for adjusting the TDRA for the second downlink communication, based at least in part on the timing of the first uplink feedback communication, to determine an adjusted TDRA for the second downlink communication and a gap for the first uplink feedback communication.

In some aspects, the UE 120 includes means for receiving the second downlink communication in the adjusted TDRA for the second downlink communication; and/or means for transmitting the first uplink feedback communication in the gap.

In some aspects, the UE 120 includes means for receiving a first transmission of the second downlink communication in the third subset of symbols; and/or means for receiving a second transmission of the second downlink communication in the fifth subset of symbols.

In some aspects, the UE 120 includes means for transmitting, to a base station, an indication of the capability of the UE; and/or means for receiving, from the base station, a configuration of the downlink to uplink switching gap.

In some aspects, the UE 120 includes means for transmitting, to a base station, an indication of the capability of the UE; and/or means for receiving, from the base station, a configuration of the uplink to downlink switching gap.

In some aspects, the UE 120 includes means for adjusting the timing of the first uplink feedback communication from a first subset of symbols in the TDRA for the second downlink communication to a second subset of symbols at an end of the TDRA for the second downlink communication; and/or means for adjusting the TDRA for the second downlink communication to determine an adjusted TDRA that excludes the second subset of symbols at the end of the TDRA for the second downlink communication.

In some aspects, the base station 110 includes means for transmitting, to a UE, a grant that schedules multiple downlink communications, wherein the grant includes multiple SLIVs that indicate respective TDRAs for the multiple downlink communications and a feedback timing indicator that indicates timing of uplink feedback communications for the multiple downlink communications; means for determining, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and/or means for transmitting, to the UE, the second downlink communication in an adjusted TDRA based at least in part on determining that there is a conflict between the timing of the first uplink feedback communication and the TDRA for the second downlink communication. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for receiving the first uplink feedback communication in the gap.

In some aspects, the base station 110 includes means for receiving, from the UE, an indication of a capability of the UE; means for determining, based at least in part on the capability of the UE, the downlink to uplink switching gap; and/or means for transmitting, to the UE, a configuration of the downlink to uplink switching gap.

In some aspects, the base station 110 includes means for receiving, from the UE, an indication of a capability of the UE; means for determining, based at least in part on the capability of the UE, the uplink to downlink switching gap; and/or means for transmitting, to the UE, a configuration of the uplink to downlink switching gap.

In some aspects, the base station 110 includes means for transmitting, to the UE, a first transmission of the second downlink communication in the third subset of symbols; and/or means for transmitting, to the UE, a second transmission of the second downlink communication in the fifth subset of symbols.

In some aspects, the base station 110 includes means for determining SLIVs to configure a TDRA for transmitting multiple downlink communications in respective slots of a plurality of slots, wherein the TDRA leaves a gap comprising one or more symbols at an end of each slot in the plurality of slots; means for determining a feedback offset timing indicator to configure an uplink feedback communication for one or more of the multiple downlink communications to be scheduled in the gap at the end of a slot in the plurality of slots; and/or means for transmitting, to a UE, a grant that schedules the multiple downlink communications, wherein the grant includes the SLIVs and the feedback offset timing indicator. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station 110 includes means for transmitting, to the UE, the multiple downlink communications in the respective slots of the plurality of slots based at least in part on the TDRA for the multiple downlink communications; and/or means for receiving, from the UE, the respective uplink feedback communication for each downlink communication of the multiple downlink communications in the gap at the end of a subsequent slot to the respective slot in which the downlink communication is transmitted, based at least in part on the feedback offset timing indicator.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error. As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
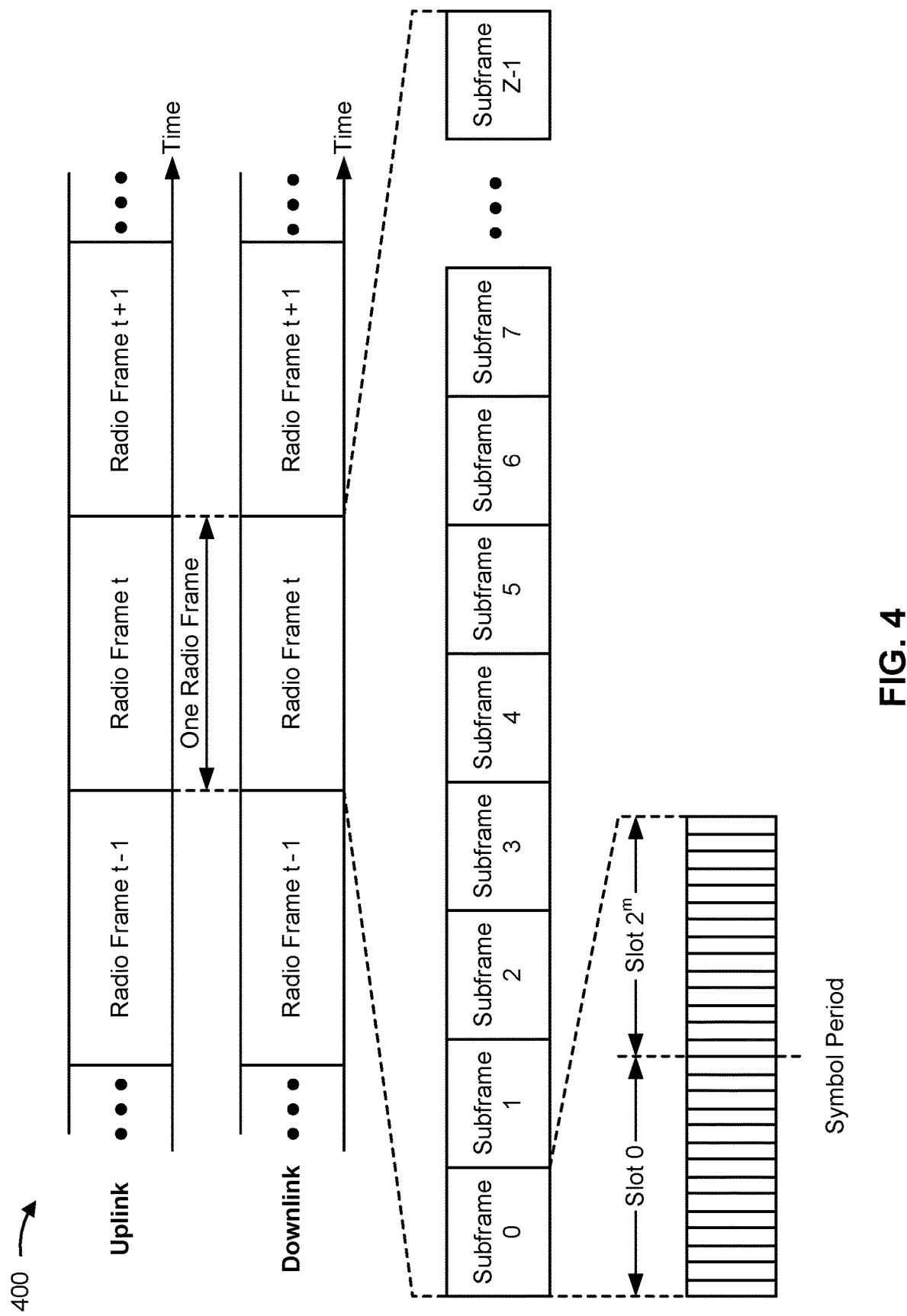
FIG. 4 is a diagram illustrating an example of a frame structure in a wireless communication network, in accordance with the present disclosure

FIG. 4 is a diagram illustrating an example 400 of a frame structure in a wireless communication network, in accordance with the present disclosure. The frame structure shown in FIG. 4 is for frequency division duplexing (FDD) in a telecommunication system, such as LTE and/or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 4, where m is an index of a numerology used for a transmission, such as 0, 1, 2, 3, or 4). Each slot may include a set of L symbol periods. For example, each slot may include fourteen symbol periods (e.g., as shown in FIG. 4), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, or symbol-based.

As indicated above, FIG. 4 is provided as an example. Other examples may differ from what is described with respect to FIG. 4.

In some aspects, a base station may schedule downlink communications to a UE using a multi-PDSCH grant. In this case, the base station may use a single downlink grant to schedule multiple PDSCH transmissions to the UE. This may reduce control overhead associated with scheduling downlink transmissions to the UE. Furthermore, slots may be shorter for communications in the millimeter wave band, particularly when a higher subcarrier spacing (SCS) is used, as compared with communications in the sub-6 GHz band. In this case, multi-PDSCH grant may enable the base station to schedule longer downlink bursts.

The base station may transmit, to the UE, DCI that indicates parameters associated with the multi-PDSCH grant. The base station may use the same frequency domain resource allocation (FDRA), modulation and coding scheme (MCS), rank, precoding, and/or other transmission parameters for the multiple PDSCH transmissions to the UE. In some cases, the multi-PDSCH DCI may indicate a first HARQ process identifier (ID) for HARQ feedback for a first PDSCH transmission, and the UE may use incremental HARQ process IDs for HARQ feedback for subsequent PDSCH transmissions. In some case, the base station may use a separate new data indicator (NDI) and a separate compressed redundancy version identifier (RVID) for each PUSCH transmission.

The multi-PDSCH DCI may indicate a TDRA for the multiple PDSCH transmissions. For example, the DCI may include a respective SLIV that indicates a starting symbol in a slot and a length (e.g., number of symbols) for each PDSCH transmission. The same SLIVs may be used to indicate the TDRA for the multiple PDSCH transmissions over multiple slots. The multi-PDSCH DCI may also indicate a PDSCH-to-HARQ feedback timing value, which may be referred to as a K1 value in the 3GPP standard. The PDSCH-to-HARQ feedback timing value may indicate a time offset (e.g., a number of slots, sub-slots, or symbols) between a last slot, sub-slot, or symbol of a PDSCH communication and a slot, sub-slot, or symbol in which HARQ feedback, corresponding to the PDSCH communication, is to be transmitted. Thus, the PDSCH-to-HARQ feedback timing value may indicate a respective slot, sub-slot, or symbol in which HARQ feedback for one or more PDSCH communications is to be transmitted. A PDSCH-to-HARQ feedback timing value may be referred to herein as a PDSCH-to-HARQ timing value or a K1 value.

In some cases, when multiple PDSCH communications are scheduled using a multi-PDSCH grant, the TDRA for one or more PDSCH communications may conflict with the timing for the UE to transmit the HARQ feedback corresponding to one or more earlier PDSCH communications. This may lead to the HARQ feedback for one or more of the PDSCH communications being delayed or not delivered, which may decrease network reliability and increase network latency. In some cases, it may be possible for the base station to pre-configure the SLIVs and the K1 value to define a TDRA and HARQ feedback pattern that do not conflict.

Some techniques and apparatuses described herein enable a UE to receive a grant that schedules multiple downlink (e.g., PDSCH) communications and determine, based at least in part on SLIVs and a K1 value included in the grant, whether there is a conflict between an uplink feedback communication for at least one first downlink communication and a TDRA for a second downlink communication. The UE may adjust the TDRA of the second downlink communication and/or the timing of the uplink feedback communication based at least in part on determining that there is a conflict. As a result, the UE may dynamically adjust the TDRA and/or feedback timing to avoid conflicts between scheduled downlink communications and uplink feedback communications. This may prevent feedback for one or more downlink communications scheduled via a multi-PDSCH grant from being delayed and/or dropped due to conflicts with another downlink communication scheduled via the multi-PDSCH grant, which may increase network reliability and decrease network latency. Furthermore, since the UE dynamically adjusts the TDRA and/or feedback timing based on determining that there is a conflict, the TDRA may not be adjusted for non-conflicting downlink communications. This may increase the scheduling flexibility of multi-PDSCH grants, as compared to pre-configuring the SLIVs and K1 values to define a non-conflicting downlink TDRA and feedback timing pattern.

Figure 5:
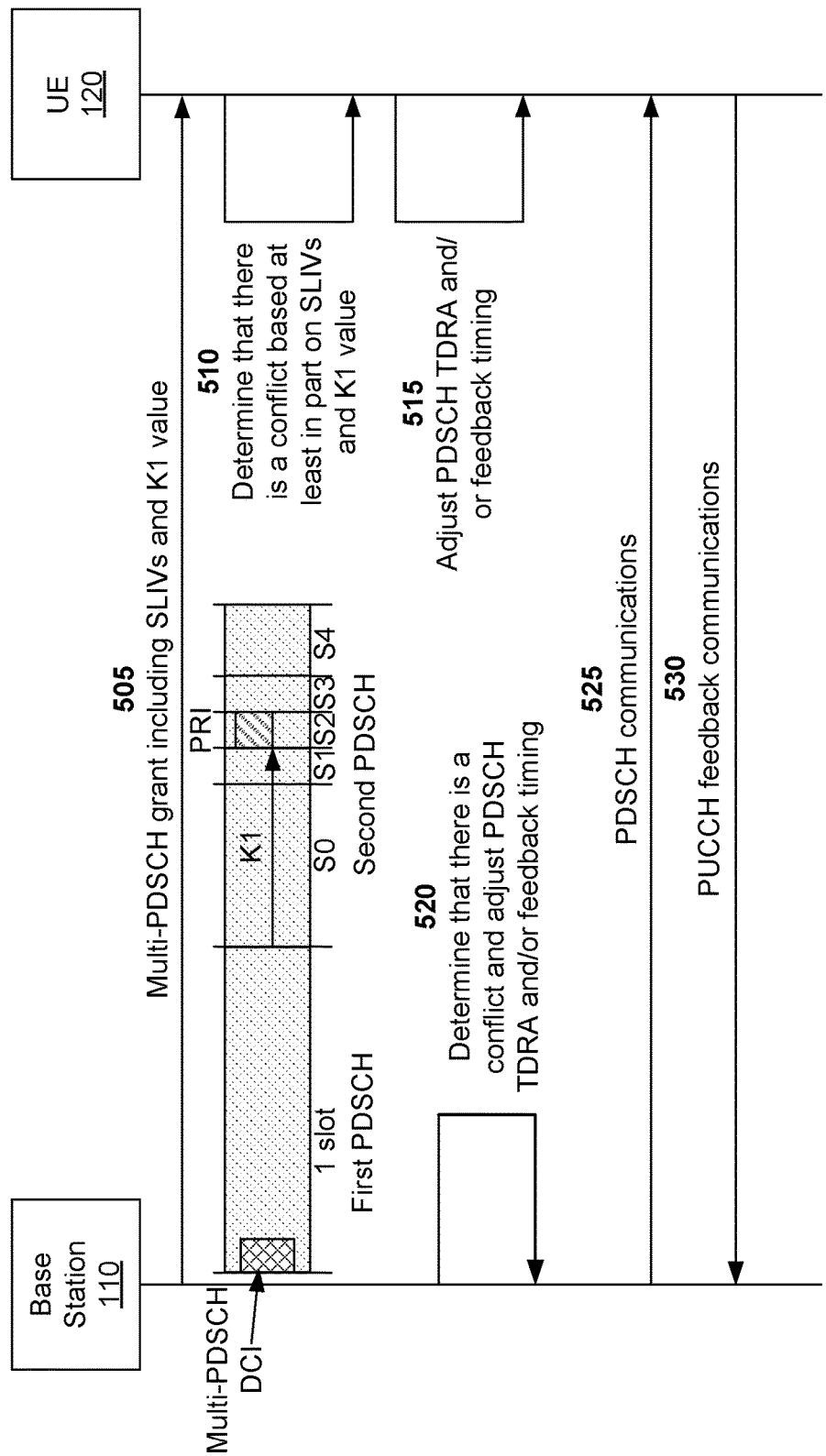
FIGS. 5-9 are diagrams illustrating examples associated with joint hybrid automatic repeat request (HARQ) timing and start and length indicator value (SLIV) design for multiple physical downlink shared channel (multi-PDSCH) grant, in accordance with the present disclosure.

FIG. 5 is a diagram illustrating an example 500 associated with joint HARQ timing and SLIV design for multi-PDSCH grant, in accordance with the present disclosure. As shown in FIG. 5, example 500 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 5, and by reference number 505, the base station 110 may transmit, to the UE 120, a grant that schedules multiple downlink communications. For example, the base station 110 may transmit, to the UE 120, a multi-PDSCH grant that schedules multiple PDSCH communications. The grant may include multiple SLIVs, including a respective SLIV for each of the multiple downlink communications, and a K1 value. Each SLIV may indicate a TDRA for a respective downlink communication. For example, the SLIV may indicate a starting symbol and a length (e.g., number of symbols) to be used, in a respective slot, for each downlink communication of the multiple downlink communications. The K1 value may indicate timing of uplink feedback communications (e.g., PUCCH communications) for the multiple downlink communications. For example, the K1 value may indicate a time offset between a downlink communication and an uplink HARQ feedback response for the downlink communication. The grant may be included in DCI (e.g., multi-PDSCH DCI). For example, the DCI may include the SLIVs for the multiple downlink communications and the K1 value. In some aspects, the DCI may also include indications of other parameters associated with multiple downlink communications, such as MCS, FDRA, rank, pre-coding, and/or an initial HARQ process ID, among other examples.

As further shown in FIG. 5, and by reference number 510, the UE 120 may determine, based at least in part on the SLIVs and the K1 value, that there is a conflict between the timing of an uplink feedback communication for a first downlink communication (or for multiple previous downlink communications) of the multiple downlink communications and the TDRA for a second downlink communication of the multiple downlink communications. The UE 120 may determine, based at least in part on the TDRA for the second downlink communication and the K1 value, a PUCCH resource indicator (PRI) of a PUCCH resource for transmitting the uplink feedback communication (e.g., HARQ feedback response) for the first downlink communication(s). In some aspects, the UE 120 may determine that the timing of the PUCCH resource for transmitting the uplink feedback communication may overlap with one or more symbols in the TDRA for the second downlink communication.

For example, as shown in FIG. 5, the UE 120 may receive multi-PDSCH DCI that schedules a first PDSCH communication in a first slot and a second PDSCH communication in a second slot. The SLIVs may indicate that the TDRA for each of the first and second PDSCH communications starts at the beginning of the respective slot and has a length of all of the symbols in the respective slot (e.g., 14 symbols). The UE 120 may determine that the PRI for the uplink feedback communication for the first PDSCH conflicts with the TDRA for the second PDSCH.

As further shown in FIG. 5, and by reference number 515, the UE 120 may adjust the TDRA of the conflicting downlink communication and/or the timing of the conflicting uplink feedback communication, based at least in part on determining that there is a conflict. For example, based at least in part on determining that there is a conflict between the timing of the uplink feedback communication for the first downlink communication and the TDRA for the second downlink communication, the UE 120 may adjust the TDRA for the second downlink communication. In some aspects, the UE 120 may adjust the TDRA for the second downlink communication, based at least in part on the timing of the conflicting uplink feedback communication, to leave a gap for the UE 120 to transmit the uplink feedback communication. In this case, the UE 120 may adjust the original TDRA for the second downlink communication to determine an adjusted TDRA for the second downlink communication and a gap for the uplink feedback communication.

In some aspects, the original TDRA for the second downlink communication may include a set of symbols for transmitting the second downlink communication. The UE 120 may partition the set of symbols in the original TDRA into multiple subsets of symbols and group the subsets into the adjusted TDRA for the second downlink communication or the gap for the uplink feedback communication. As shown in the example of FIG. 5, the UE 120 may partition the symbols in the original TDRA for the second downlink communication (e.g., second PDSCH) into five subsets: S0, S1, S2, S3, and S4. In some aspects, the UE 120 may partition the symbols into different number of subsets. For example, in some aspects, the UE 120 may combine two or more of the subsets shown in FIG. 5.

Each of the subsets (S0, S1, S2, S3, and S4) may include a respective sequence of symbols in the original TDRA. As used herein, "S2" may refer to a one or more symbols for transmitting the uplink feedback communication (e.g., the uplink feedback communication for the first PDSCH). That is, S2 may be one or more symbols that correspond to the PRI for the uplink feedback communication determined from the K1 value. As used herein, "S1" may refer to a subset of symbols preceding S2 that provides a downlink to uplink switching gap. For example, the downlink to uplink switching gap (S1) may correspond to an amount of time for the UE 120 to switch from receiving downlink communications to transmitting uplink communications. For example, the downlink to uplink switching gap (S1) may correspond to an amount of time for the UE 120 to switch from receiving downlink communication to transmitting uplink communications. As used herein, "S3" may refer to a subset of symbols subsequent to S2 that provides an uplink to downlink switching gap. For example, the uplink to downlink switching gap (S3) may correspond to an amount of time for the UE 120 to switch from transmitting uplink communications to receiving downlink communications.

In some aspects, the number of symbols in S1 and/or the number of symbols in S3 may be configured by the base station 110. For example, the base station 110 may transmit, to the UE 120, configuration information (e.g., radio resource control (RRC) configuration information) that includes an indication of the length of S1 and/or an indication of the length of S3. In some aspects, the base station 110 may determine the length of S1 and/or the length of S3 based at least in part on a capability of the UE 120. For example, the base station 110 may configure S1 and/or S3 based at least in part on UE capability information received from the UE 120. In some aspects, the length of S3 may be configured to be zero. In this case, S3 may be combined with S4.

As used herein, "S0" may refer to a subset of symbols preceding S1 in the original TDRA. As used herein, "S4" may refer to subset of symbols subsequent to S3 in the original TDRA. In a case in which S3 is configured to 0 (e.g., there is no S3 subset), S4 may include the symbols subsequent to S2 in the original TDRA. The length of S0 and/or S4 may depend on the location of the PRI (S2) for the uplink feedback communication in the original TDRA.

In some aspects, the UE 120 may eliminate at least S2 and S1 from the original TDRA for the second downlink communication. In some aspects, the UE 120 may determine the adjusted TDRA for the second downlink communication to include S0 (e.g., the symbols prior to S1) in the original TDRA, and the UE 120 may determine the gap for the uplink feedback communication to include S1, S2, and any symbols subsequent to S2 in the original TDRA (e.g., S3 and S4). In this case, if the PRI is in the middle of the original TDRA, S4 may not be utilized.

In some aspects, if the PRI is in the middle of the original TDRA, the UE 120 may determine the adjusted TDRA for the second downlink communication to include S0 (e.g., the symbols prior to S1) and S4 (e.g., the symbols subsequent to S3), and the UE 120 may determine the gap for the uplink feedback communication to include S1, S2, and S3. In this case, the base station 110 may use type B scheduling to schedule separate transmissions of the second downlink communication (e.g., PDSCH communication) in S0 and S4. For example, the base station 110 may perform a first transmission of a transmission block (TB) in S0, and the base station 110 may perform a second transmission of the same TB in S4. In some aspects, the base station 110 may use different RVIDs for the first and second transmission.

In some aspects, the UE 120 may adjust the TDRA of the second downlink communication and the timing of the conflicting uplink feedback communication to determine the adjusted TDRA and the gap for the uplink feedback communication. In some aspects, the UE 120 may move the timing for the uplink feedback communication to an end of the original TDRA. For example, the UE 120 may move S2 to a last subset of symbols in the original TDRA, and the UE 120 may move S1 to a subset of symbols immediately preceding S2. The UE 120 may then include all of the symbols preceding S1 and S2 in the adjusted TDRA.

As further shown in FIG. 5, and by reference number 520, the base station 110 may also determine that there is a conflict based at least in part on the SLIVs and the K1 value, as described above in connection with the UE 120. The base station 110 may also determine the adjusted TDRA and the gap for the feedback timing, as described above in connection with the UE 120. Accordingly, the base station 110 may adjust the TDRA for a downlink communication to be the same as the adjusted TDRA determined by the UE 120.

As further shown in FIG. 5, and by reference number 525, the base station 110 may transmit the multiple downlink communications (e.g., PDSCH) to the UE 120. In a case in which the UE 120 has adjusted the TDRA for a downlink communication (e.g., the second downlink communication) based on a conflict for an uplink feedback communication, the base station 110 may determine the same adjusted TDRA for the downlink communication as the adjusted TDRA determined by the UE 120, and the base station 110 may transmit the downlink communication in the adjusted TDRA determined for the downlink communication.

As further shown in FIG. 5, and by reference number 530, the UE 120 may transmit, to the base station 110, uplink feedback communications (e.g., PUCCH feedback communications) for the downlink (e.g., PDSCH) communications received from the base station 110. For example, the UE 120 may transmit, to the base station 110, a PUCCH communication including a HARQ ACK or a HARQ NACK for each downlink communication received from the base station 110. The UE 120 may transmit the uplink feedback communications in the gaps, determined by the UE 120, in the TDRA for the downlink communications.

As described above in connection with FIG. 5, the base station 110 may transmit, to the UE 120, a grant that schedules multiple downlink communications. The UE 120 may determine, based at least in part on the SLIVs and the K1 value included in the grant, whether there is a conflict between an uplink feedback communication for a first downlink communication and a TDRA for a second downlink communication. The UE 120 may adjust the TDRA of the second downlink communication and/or the timing of the uplink feedback communication based at least in part on determining that there is a conflict. This may prevent feedback for downlink communications scheduled via a multi-PDSCH grant from being delayed and/or dropped due to a conflict with other downlink communications scheduled via the multi-PDSCH grant, which may increase network reliability and decrease network latency. Furthermore, since the UE dynamically adjusts the TDRA and/or feedback timing based on determining that there is a conflict, a large table of non-conflicting SLIVs and K1 values does not need to be configured and stored by the base station 110 or the UE 120, thus conserving computing and memory resources.

As indicated above, FIG. 5 is provided as an example. Other examples may differ from what is described with respect to FIG. 5.

Figure 6:
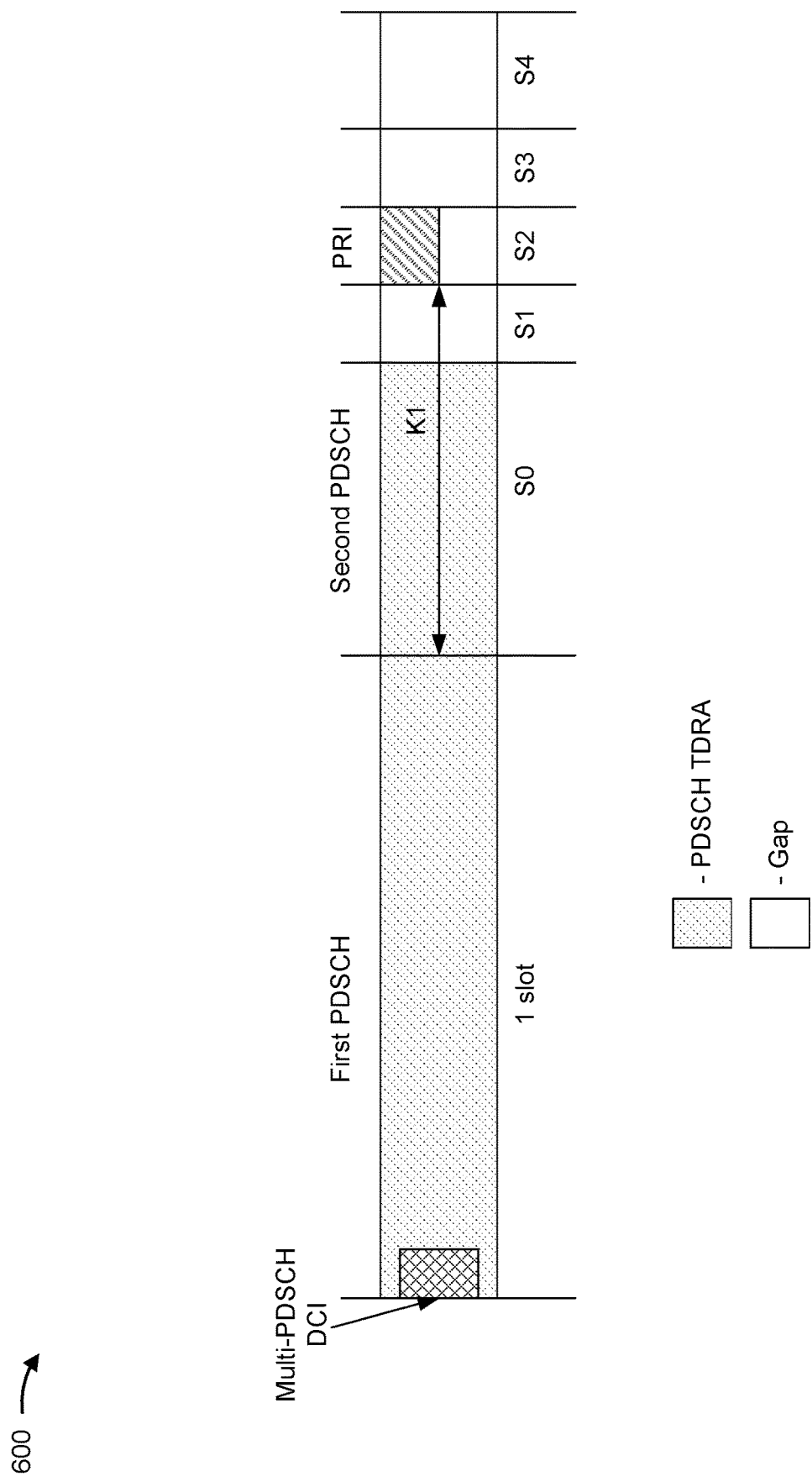

FIG. 6 is a diagram illustrating an example 600 associated with joint HARQ timing and SLIV design for multi-PDSCH grant, in accordance with the present disclosure. As shown in FIG. 6, in example 600, a UE may receive multi-PDSCH DCI that schedules a first PDSCH communication in a first slot and a second PDSCH communication in a second slot. The SLIVs may indicate that the TDRA for each of the first and second PDSCH communications starts at the beginning of the respective slot and has a length of all of the symbols in the respective slot (e.g., 14 symbols). The K1 value may indicate the slot offset between the slot of the first PDSCH and the slot containing the PUCCH occasion for the uplink feedback for the first PDSCH. The UE 120 may determine that the PRI for the uplink feedback communication for the first PDSCH conflicts with the TDRA for the second PDSCH.

As shown in FIG. 6, the UE may eliminate S1-S4 from the original TDRA of the second PDSCH. In this case, the UE may determine the adjusted TDRA for the second PDSCH to include S0 (e.g., the symbols prior to S1) in the original TDRA, and the UE may determine the gap for the uplink feedback communication to include S1-S4. In some aspects, the base station may adjust the transmission of the second PDSCH based at least in part on the adjusted TDRA for the second PDSCH. For example, the base station may rate-match the second PDSCH based at least in part on S0.

As indicated above, FIG. 6 is provided as an example. Other examples may differ from what is described with respect to FIG. 6.

Figure 7:
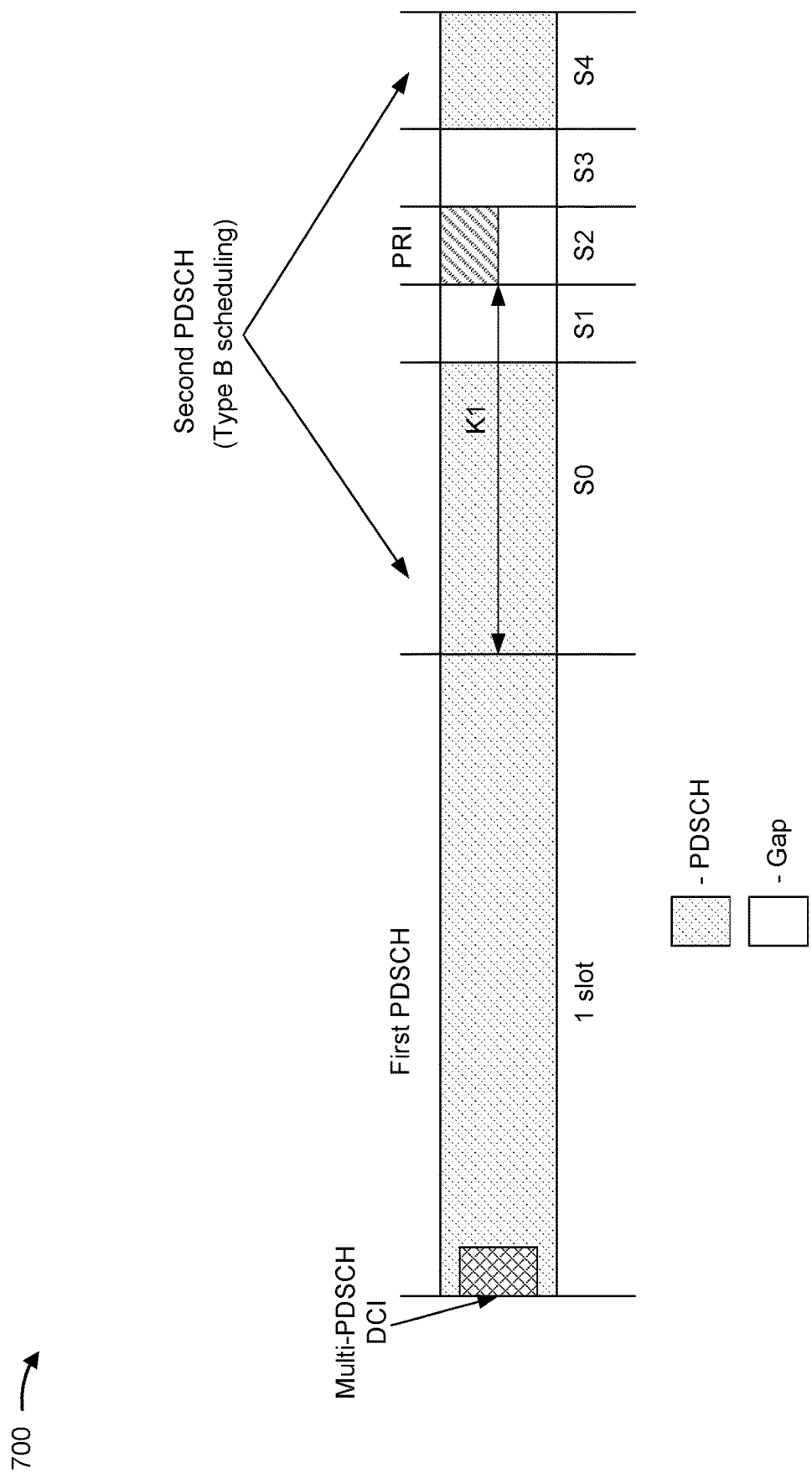

FIG. 7 is a diagram illustrating an example 700 associated with joint HARQ timing and SLIV design for multi-PDSCH grant, in accordance with the present disclosure. As shown in FIG. 7, in example 700, a UE may receive multi-PDSCH DCI that schedules a first PDSCH communication in a first slot and a second PDSCH communication in a second slot. The SLIVs may indicate that the TDRA for each of the first and second PDSCH communications starts at the beginning of the respective slot and has a length of all of the symbols in the respective slot (e.g., 14 symbols). The K1 value may indicate the slot offset between the slot of the first PDSCH and the slot containing PUCCH occasion for the uplink feedback for the first PDSCH. The UE may determine that the PRI for the uplink feedback communication for the first PDSCH conflicts with the TDRA for the second PDSCH.

As shown in FIG. 7, the UE may eliminate S1-S3 from the original TDRA of the second PDSCH. In this case, the UE may determine the adjusted TDRA for the second PDSCH includes S0 (e.g., the symbols prior to S1) and S4 (e.g., the symbols subsequent to S3). The UE may determine the gap for the uplink feedback communication to include 51, S2, and S3. In this case, the base station may use type B scheduling to schedule separate transmissions of the second PDSCH communication in S0 and S4. For example, the base station may perform a first transmission of a TB in S0, and the base station may perform a second transmission of the same TB in S4. In some aspects, the base station may use different RVIDs for the first and second transmission. Type B PDSCH scheduling may utilize at least two symbols. Accordingly, in some aspects, if either S0 or S4 is one symbol long, the UE may not include that subset in the adjusted TDRA for the second PDSCH. In some aspects, in cases where the PRI is in the middle of the original TDRA, using S0 and S4 for type B mini-slot scheduling of a PDSCH transmission may provide a more effective use of resources, as compared with only using S0 or S4.

As indicated above, FIG. 7 is provided as an example. Other examples may differ from what is described with respect to FIG. 7.

Figure 8:
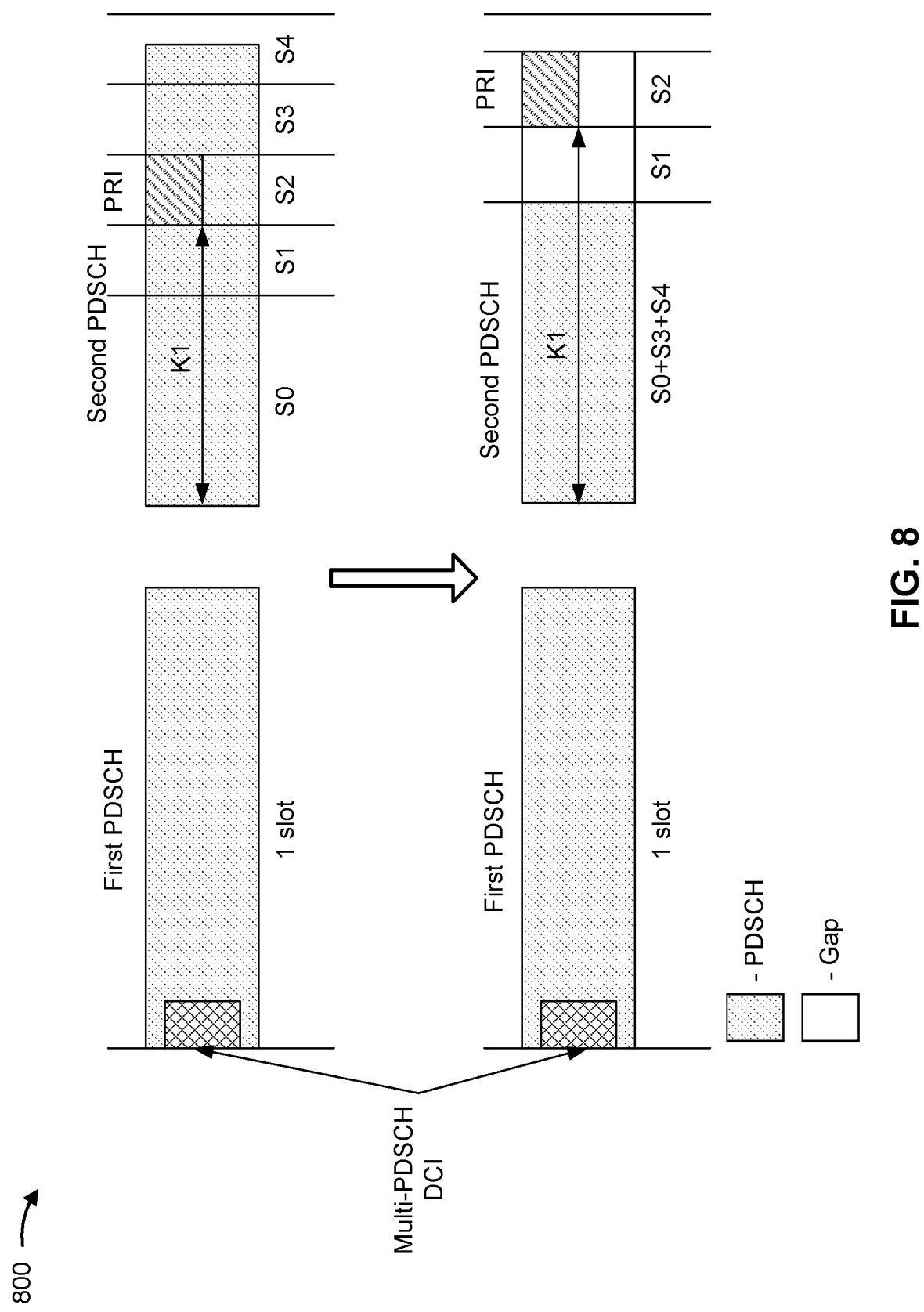

FIG. 8 is a diagram illustrating an example 800 associated with joint HARQ timing and SLIV design for multi-PDSCH grant, in accordance with the present disclosure. As shown in FIG. 8, in example 800, a UE may receive multi-PDSCH DCI that schedules a first PDSCH communication in a first slot and a second PDSCH communication in a second slot. The K1 value may indicate the slot offset between the slot containing the first PDSCH and the slot containing the PUCCH for the uplink feedback for the first PDSCH. The UE 120 may determine that the PUCCH for the uplink feedback communication for the first PDSCH conflicts with the TDRA for the second PDSCH.

As shown in FIG. 8, the UE may move the uplink resource for the uplink feedback communication to an end of the original TDRA for the second PDSCH. For example, the UE may move S2 to a last subset of symbols in the original TDRA, and the UE may move S1 to a subset of symbols immediately preceding S2. The UE may then include all of the symbols preceding S1 and S2 in the adjusted TDRA. By moving S1 and S2 to the end of the original TDRA, the UE sets S3=S4=0 and adjusts S0 such that the number of symbols of the adjusted S0 (e.g., the subset of symbols before S1) is equal to S0+S3+S4 in the original TDRA. This allows the UE to only shorten the original TDRA by S1+S2 and group the remaining symbols together for the adjusted PDSCH TDRA, which increases the resources available for the second PDSCH communication. In addition, in this case, the base station may configure S1 without configuring S3, which reduces control signaling overhead.

As indicated above, FIG. 8 is provided as an example. Other examples may differ from what is described with respect to FIG. 8.

Figure 9:
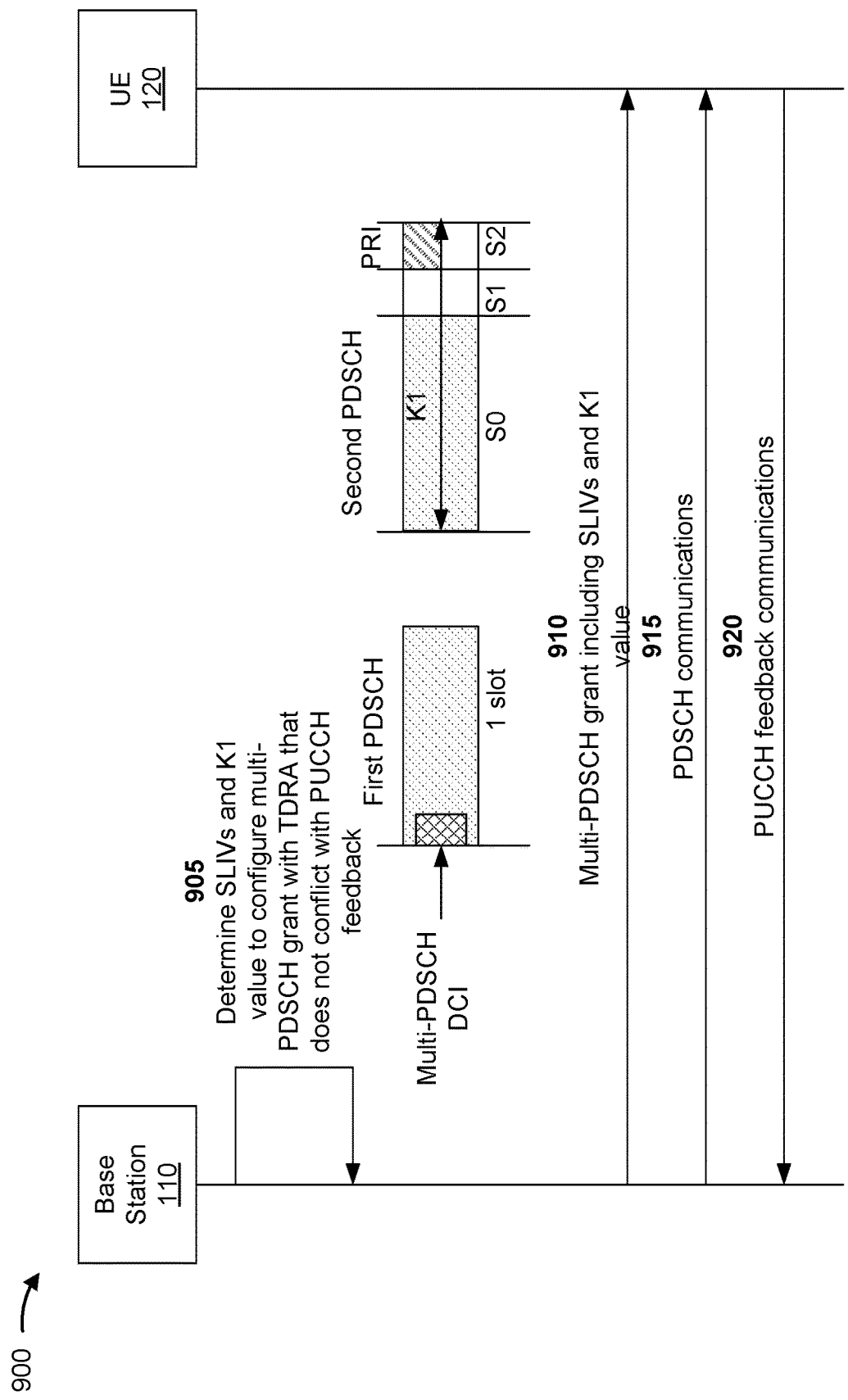

FIG. 9 is a diagram illustrating an example 900 associated with joint HARQ timing and SLIV design for multi-PDSCH grant, in accordance with the present disclosure. As shown in FIG. 9, example 900 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

As shown in FIG. 9, and by reference number 905, the base station 110 may determine SLIVs and a K1 value to configure a grant of multiple downlink communications (e.g., multi-PDSCH grant) with a TDRA that does not conflict with uplink feedback communications (e.g., PUCCH feedback communications) for the downlink communications. The base station 110 may determine a SLIV to configure a TDRA for transmitting multiple downlink communications in respective slots. In some aspects, the base station 110 may determine the SLIVs to configure the TDRA to leave a gap including one or more symbols at the end of each slot. In this case, the TDRA for each downlink communication may be less than the length of the slot.

In some aspects, the base station 110 may determine a K1 value such that the time offset from the end of a downlink communication places the uplink feedback for that downlink communication at the end of the slot subsequent to the slot in which that downlink communication is scheduled. In some aspects, the uplink feedback communication may be for multiple prior downlink communications. As shown in the example of FIG. 9, the base station 110 may include SLIVs and K1 value in multi-PDSCH DCI that schedules a first PDSCH in a first slot and a second PDSCH in a second slot. The base station 110 may determine the SLIVs to leave a gap of length S1+S2 at the end of each slot. The base station 110 may determine the K1 value such that the PUCCH resource for the uplink feedback communication for the first PDSCH communication is in the gap at the end of the second slot. In this case, the base station 110 may pre-configure a gap of S1+S2, with a TDRA of S0, for each PDSCH communication.

As further shown in FIG. 9, and by reference number 910, the base station 110 may transmit, to the UE 120, the grant of the multiple downlink communications (e.g., the multi-PDSCH grant). The grant may include the SLIVs and the K1 value determined by the base station 110.

As further shown in FIG. 9, and by reference number 915, the base station 110 may transmit the multiple downlink (e.g., PDSCH) communications to the UE 120 based at least in part on the TDRA configured by the SLIVs. For example, the base station 110 may transmit, the multiple downlink communications over multiple slots in the TDRA that leaves a gap at the end of each slot.

As further shown in FIG. 9, and by reference number 920, the UE 120 may transmit, to the base station 110, uplink feedback communications (e.g., PUCCH feedback communications) for the multiple downlink communications received from the base station 110. The UE 120 may transmit, to the base station 110, uplink feedback communications (e.g., PUCCH feedback communications) for the downlink (e.g., PDSCH) communications received from the base station 110. For example, the UE 120 may transmit, to the base station 110, a PUCCH communication including a HARQ ACK or a HARQ NACK for each downlink communication received from the base station 110. Based at least in part on the K1 value, the UE 120 may transmit the uplink feedback communications in the gaps at the end of the slots. For example, the UE 120 may receive a first downlink communication in a first slot, and the UE 120 may transmit the uplink feedback communication for the first downlink communication in the gap at the end of a second slot.

As described above in connection with FIG. 9, the base station 110 may determine SLIVs and a K1 value to configure a grant of multiple downlink communications, with a TDRA that does not conflict with uplink feedback communications for the downlink communications. The base station 110 may transmit, to the UE 120, that grant that schedules multiple downlink communications and includes the SLIVs and the K1 value. This may prevent conflicts between uplink feedback communications and downlink communications in the case of a multi-PDSCH grant, which may increase network reliability and decrease network latency. Furthermore, this may reduce processing time and resources that may otherwise be used for the UE 120 to determine that a conflict exist and adjust the TDRA and/or feedback timing.

As indicated above, FIG. 9 is provided as an example. Other examples may differ from what is described with respect to FIG. 9.

Figure 10:
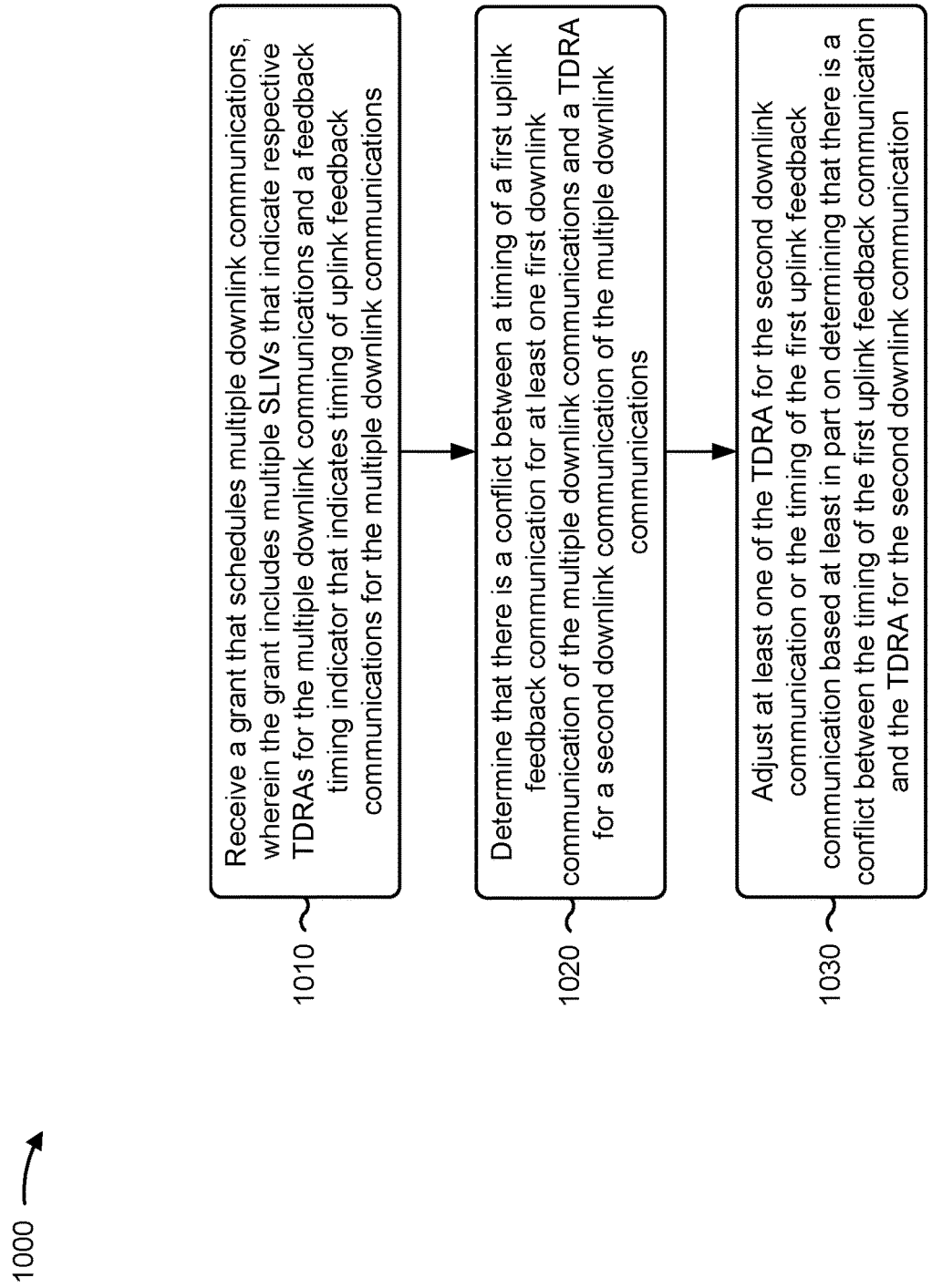
FIGS. 10-12 are diagrams illustrating example processes associated with joint HARQ timing and SLIV design for multi-PDSCH grant, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with joint HARQ timing and SLIV design for multi-PDSCH grant.

As shown in FIG. 10, in some aspects, process 1000 may include receiving a grant that schedules multiple downlink communications, wherein the grant includes multiple SLIVs that indicate respective TDRAs for the multiple downlink communications and a feedback timing indicator that indicates timing of uplink feedback communications for the multiple downlink communications (block 1010). For example, the UE (e.g., using reception component 1302, depicted in FIG. 13) may receive a grant that schedules multiple downlink communications, wherein the grant includes multiple SLIVs that indicate respective TDRAs for the multiple downlink communications and a feedback timing indicator that indicates timing of uplink feedback communications for the multiple downlink communications, as described above.

As further shown in FIG. 10, in some aspects, process 1000 may include determining, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications (block 1020). For example, the UE (e.g., using determination component 1308, depicted in FIG. 13) may determine, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications, as described above.

As further shown in FIG. 10, in some aspects, process 1000 may include adjusting at least one of the TDRA for the second downlink communication or the timing of the first uplink feedback communication based at least in part on determining that there is a conflict between the timing of the first uplink feedback communication and the TDRA for the second downlink communication (block 1030). For example, the UE (e.g., using adjustment component 1310, depicted in FIG. 13) may adjust at least one of the TDRA for the second downlink communication or the timing of the first uplink feedback communication based at least in part on determining that there is a conflict between the timing of the first uplink feedback communication and the TDRA for the second downlink communication, as described above.

Process 1000 may include additional aspects, such as any single aspect or any combination of aspects described below and/or in connection with one or more other processes described elsewhere herein.

In a first aspect, the downlink communications are PDSCH communications, and the grant is included in downlink control information.

In a second aspect, alone or in combination with the first aspect, the feedback timing indicator indicates a time offset between a downlink communication of the multiple downlink communications and a PUCCH resource for an uplink feedback communication.

In a third aspect, alone or in combination with one or more of the first and second aspects, adjusting at least one of the TDRA for the second downlink communication or the timing of the first uplink feedback communication comprises adjusting the TDRA for the second downlink communication, based at least in part on the timing of the first uplink feedback communication, to determine an adjusted TDRA for the second downlink communication and a gap for the first uplink feedback communication.

In a fourth aspect, alone or in combination with the third aspect, process 1000 includes receiving the second downlink communication in the adjusted TDRA for the second downlink communication and transmitting the first uplink feedback communication in the gap.

In a fifth aspect, alone or in combination with one or more of the third through fourth aspects, the gap includes a first subset of symbols for transmitting the first uplink feedback communication and a second subset of symbols preceding the first subset of symbols to provide a downlink to uplink switching gap, and the adjusted TDRA includes a third subset of symbols preceding the second subset of symbols in the TDRA for the second downlink communication.

In a sixth aspect, alone or in combination with the fifth aspect, the downlink to uplink switching gap is based at least in part on a capability of the UE, and process 1000 includes transmitting, to a base station, an indication of the capability of the UE and receiving, from the base station, a configuration of the downlink to uplink switching gap.

In a seventh aspect, alone or in combination with one or more of the fifth through sixth aspects, the gap further includes a fourth subset of symbols subsequent to the first subset of symbols in the TDRA for the second downlink communication.

In an eighth aspect, alone or in combination with one or more of the fifth through sixth aspects, the gap further includes a fourth subset of symbols subsequent to the first subset of symbols to provide an uplink to downlink switching gap, and the adjusted TDRA further includes a fifth subset of symbols subsequent to the fourth subset of symbols in the TDRA for the second downlink communication.

In a ninth aspect, alone or in combination with the eighth aspect, the uplink to downlink switching gap is based at least in part on a capability of the UE, and process 1000 includes transmitting, to a base station, an indication of the capability of the UE and receiving, from the base station, a configuration of the uplink to downlink switching gap.

In a tenth aspect, alone or in combination with the eighth aspect, process 1000 includes receiving a first transmission of the second downlink communication in the third subset of symbols and receiving a second transmission of the second downlink communication in the fifth subset of symbols.

In an eleventh aspect, alone or in combination with the tenth aspect, the third subset of symbols includes two or more symbols, and the fifth subset of symbols includes two or more symbols.

In a twelfth aspect, alone or in combination with one or more of the first and second aspects, adjusting at least one of the TDRA for the second downlink communication or the timing of the first uplink feedback communication comprises adjusting the timing of the first uplink feedback communication from a first subset of symbols in the TDRA for the second downlink communication to a second subset of symbols at an end of the TDRA for the second downlink communication, and adjusting the TDRA for the second downlink communication to determine an adjusted TDRA that excludes the second subset of symbols at the end of the TDRA for the second downlink communication.

In a thirteenth aspect, alone or in combination with the twelfth aspect, the second subset of symbols includes one or more symbols for transmitting the first uplink feedback communication and a downlink to uplink switching gap preceding the one or more symbols for transmitting the first uplink feedback communication, and the adjusted TDRA includes symbols preceding the downlink to uplink switching gap in the TDRA for the second downlink communication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
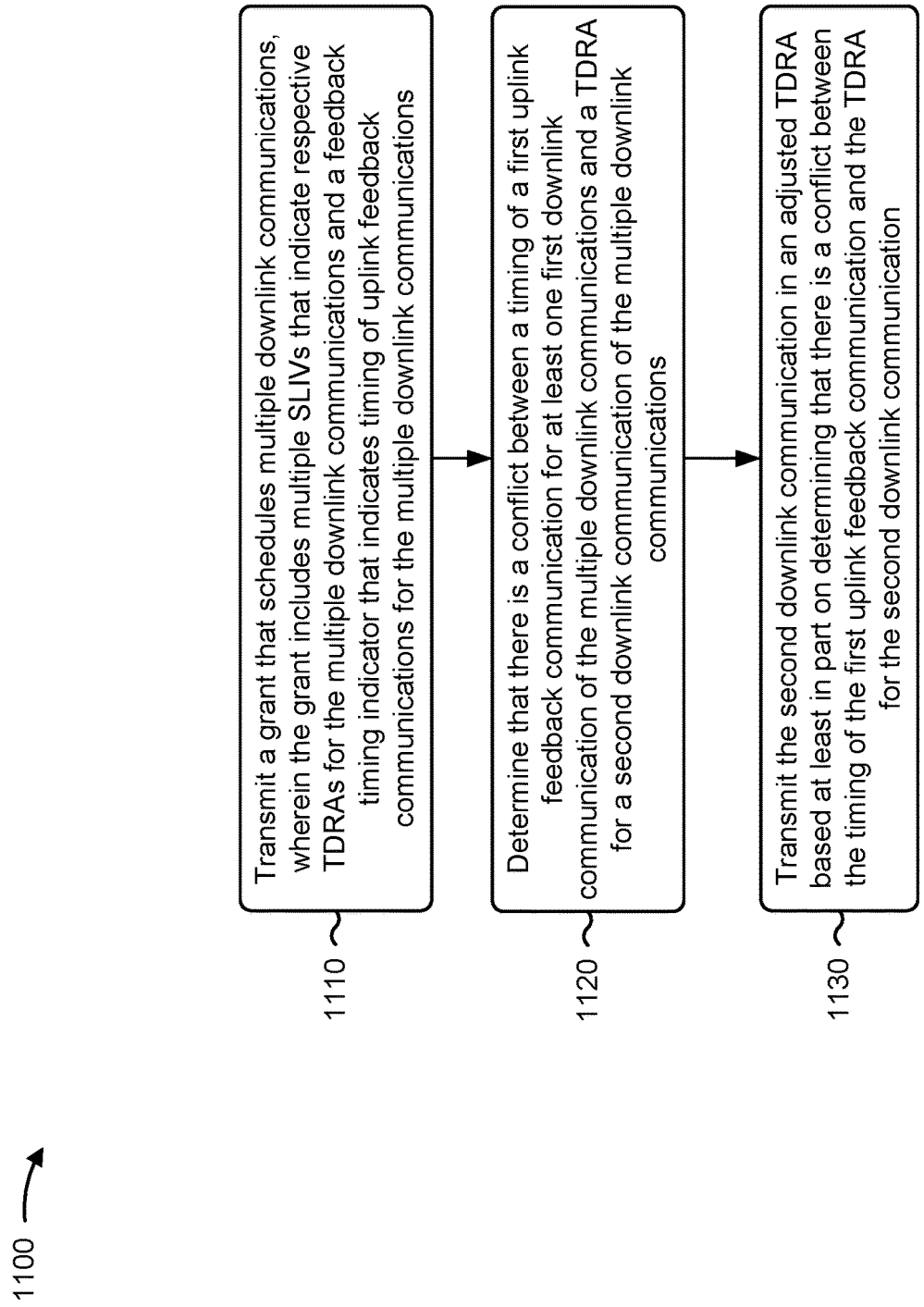

FIG. 11 is a diagram illustrating an example process 1100 performed, for example, by a base station, in accordance with the present disclosure. Example process 1100 is an example where the base station (e.g., base station 110) performs operations associated with joint HARQ timing and SLIV design for multi-PDSCH grant.

As shown in FIG. 11, in some aspects, process 1100 may include transmitting, to a UE, a grant that schedules multiple downlink communications, wherein the grant includes SLIVs that indicate respective TDRAs for the multiple downlink communications and a feedback timing indicator that indicates timing of uplink feedback communications for the multiple downlink communications (block 1110). For example, the base station (e.g., using transmission component 1404, depicted in FIG. 14) may transmit, to a UE, a grant that schedules multiple downlink communications, wherein the grant includes SLIVs that indicate a TDRA for each of the multiple downlink communications and a feedback timing indicator that indicates timing of uplink feedback communications for the multiple downlink communications, as described above.

As further shown in FIG. 11, in some aspects, process 1100 may include determining, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications (block 1120). For example, the base station (e.g., using determination component 1408, depicted in FIG. 14) may determine, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications, as described above.

As further shown in FIG. 11, in some aspects, process 1100 may include transmitting, to the UE, the second downlink communication in an adjusted TDRA based at least in part on determining that there is a conflict between the timing of the first uplink feedback communication and the TDRA for the second downlink communication (block 1130). For example, the base station (e.g., using transmission component 1404, depicted in FIG. 14) may transmit, to the UE, the second downlink communication in an adjusted TDRA based at least in part on determining that there is a conflict between the timing of the first uplink feedback communication and the TDRA for the second downlink communication, as described above.

Process 1100 may include additional aspects, such as any single aspect or any combination of aspects described below and/or in connection with one or more other processes described elsewhere herein.

In a first aspect, the downlink communications are PDSCH, the grant is included in downlink control information, and the feedback timing indicator indicates a time offset between a downlink communication of the multiple downlink communications and a PUCCH resource for an uplink feedback communication.

In a second aspect, alone or in combination with the first aspect, the TDRA for the second downlink communication is adjusted based at least in part on the timing of the first uplink feedback communication, to determine the adjusted TDRA for the second downlink communication and a gap for the first uplink feedback communication.

In a third aspect, alone or in combination with the second aspect, process 1100 includes receiving the first uplink feedback communication in the gap.

In a fourth aspect, alone or in combination with one or more of the second and third aspects, the gap includes a first subset of symbols for transmitting the first uplink feedback communication and a second subset of symbols preceding the first subset of symbols to provide a downlink to uplink switching gap, and the adjusted TDRA includes a third subset of symbols preceding the second subset of symbols in the TDRA for the second downlink communication.

In a fifth aspect, alone or in combination with the fourth aspect, process 1100 includes receiving, from the UE, an indication of a capability of the UE, determining, based at least in part on the capability of the UE, the downlink to uplink switching gap, and transmitting, to the UE, a configuration of the downlink to uplink switching gap.

In a sixth aspect, alone or in combination with one or more of the fourth through fifth aspects, the gap further includes a fourth subset of symbols subsequent to the first subset of symbols in the TDRA for the second downlink communication.

In a seventh aspect, alone or in combination with one or more of the fourth through fifth aspects, the gap further includes a fourth subset of symbols subsequent to the first subset of symbols to provide an uplink to downlink switching gap, and the adjusted TDRA further includes a fifth subset of symbols subsequent to the fourth subset of symbols in the TDRA for the second downlink communication.

In an eighth aspect, alone or in combination with the seventh aspect, process 1100 includes receiving, from the UE, an indication of a capability of the UE, determining, based at least in part on the capability of the UE, the uplink to downlink switching gap, and transmitting, to the UE, a configuration of the uplink to downlink switching gap.

In a ninth aspect, alone or in combination with one or more of the seventh through eighth aspects, transmitting the second downlink communication in the adjusted TDRA includes transmitting, to the UE, a first transmission of the second downlink communication in the third subset of symbols, and transmitting, to the UE, a second transmission of the second downlink communication in the fifth subset of symbols.

In a tenth aspect, alone or in combination with the first aspect, the timing of the first uplink feedback communication is adjusted from a first subset of symbols in the TDRA for the second downlink communication to a second subset of symbols at an end of the TDRA for the second downlink communication, and the adjusted TDRA excludes the second subset of symbols at the end of the TDRA for the second downlink communication.

In an eleventh aspect, alone or in combination with the tenth aspect, the second subset of symbols includes one or more symbols for transmitting the first uplink feedback communication and a downlink to uplink switching gap preceding the one or more symbols for transmitting the first uplink feedback communication, and the adjusted TDRA includes symbols preceding the downlink to uplink switching gap in the TDRA for the second downlink communication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
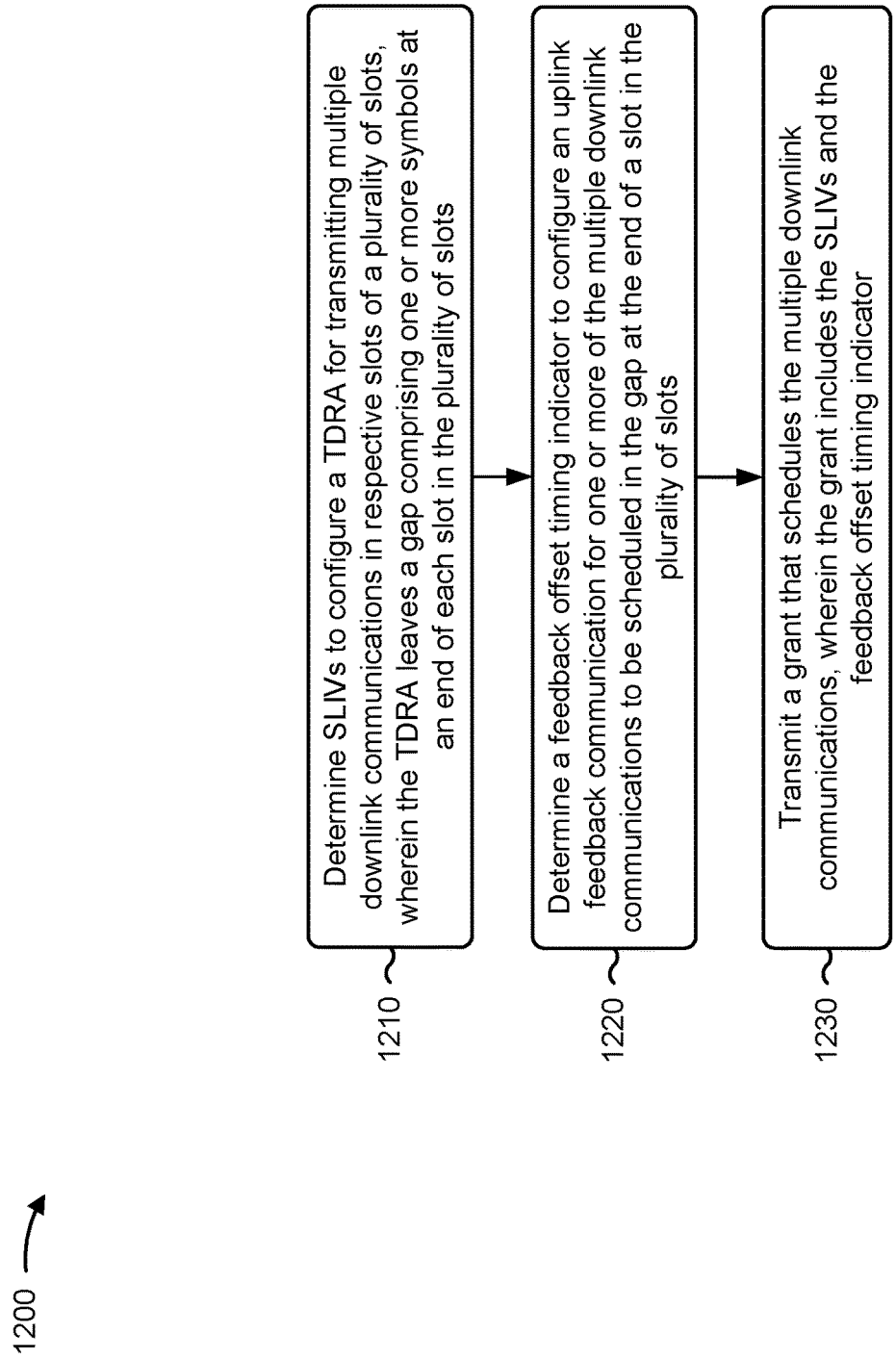

FIG. 12 is a diagram illustrating an example process 1200 performed, for example, by a base station, in accordance with the present disclosure. Example process 1200 is an example where the base station (e.g., base station 110) performs operations associated with joint HARQ timing and SLIV design for multi-PDSCH grant.

As shown in FIG. 12, in some aspects, process 1200 may include determining SLIVs to configure a TDRA for transmitting multiple downlink communications in respective slots of a plurality of slots, wherein the TDRA leaves a gap comprising one or more symbols at an end of each slot in the plurality of slots (block 1210). For example, the base station (e.g., using determination component 1408, depicted in FIG. 14) may determine SLIVs to configure a TDRA for transmitting multiple downlink communications in respective slots of a plurality of slots, wherein the TDRA leaves a gap comprising one or more symbols at an end of each slot in the plurality of slots, as described above.

As further shown in FIG. 12, in some aspects, process 1200 may include determining a feedback offset timing indicator to configure an uplink feedback communication for one or more of the multiple downlink communications to be scheduled in the gap at the end of a slot in the plurality of slots (block 1220). For example, the base station (e.g., using determination component 1408, depicted in FIG. 14) may determine a feedback offset timing indicator to configure a respective uplink feedback communication for each downlink communication of the multiple downlink communications to be scheduled in the gap at the end of a slot in the plurality of slots, as described above.

As further shown in FIG. 12, in some aspects, process 1200 may include transmitting, to a UE, a grant that schedules the multiple downlink communications, wherein the grant includes the SLIVs and the feedback offset timing indicator (block 1230). For example, the base station (e.g., using transmission component 1404, depicted in FIG. 14) may transmit, to a UE, a grant that schedules the multiple downlink communications, wherein the grant includes the SLIVs and the feedback offset timing indicator, as described above.

Process 1200 may include additional aspects, such as any single aspect or any combination of aspects described below and/or in connection with one or more other processes described elsewhere herein.

In a first aspect, the one or more symbols at the end of each slot includes one or more symbols for transmitting an uplink feedback communication and a downlink to uplink switching gap preceding the one or more symbols for transmitting the uplink feedback communication.

In a second aspect, alone or in combination with the first aspect, process 1200 includes transmitting, to the UE, the multiple downlink communications in the respective slots of the plurality of slots based at least in part on the TDRA for the multiple downlink communications, and receiving, from the UE, the respective uplink feedback communication for each downlink communication of the multiple downlink communications in the gap at the end of a subsequent slot to the respective slot in which the downlink communication is transmitted, based at least in part on the feedback offset timing indicator.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
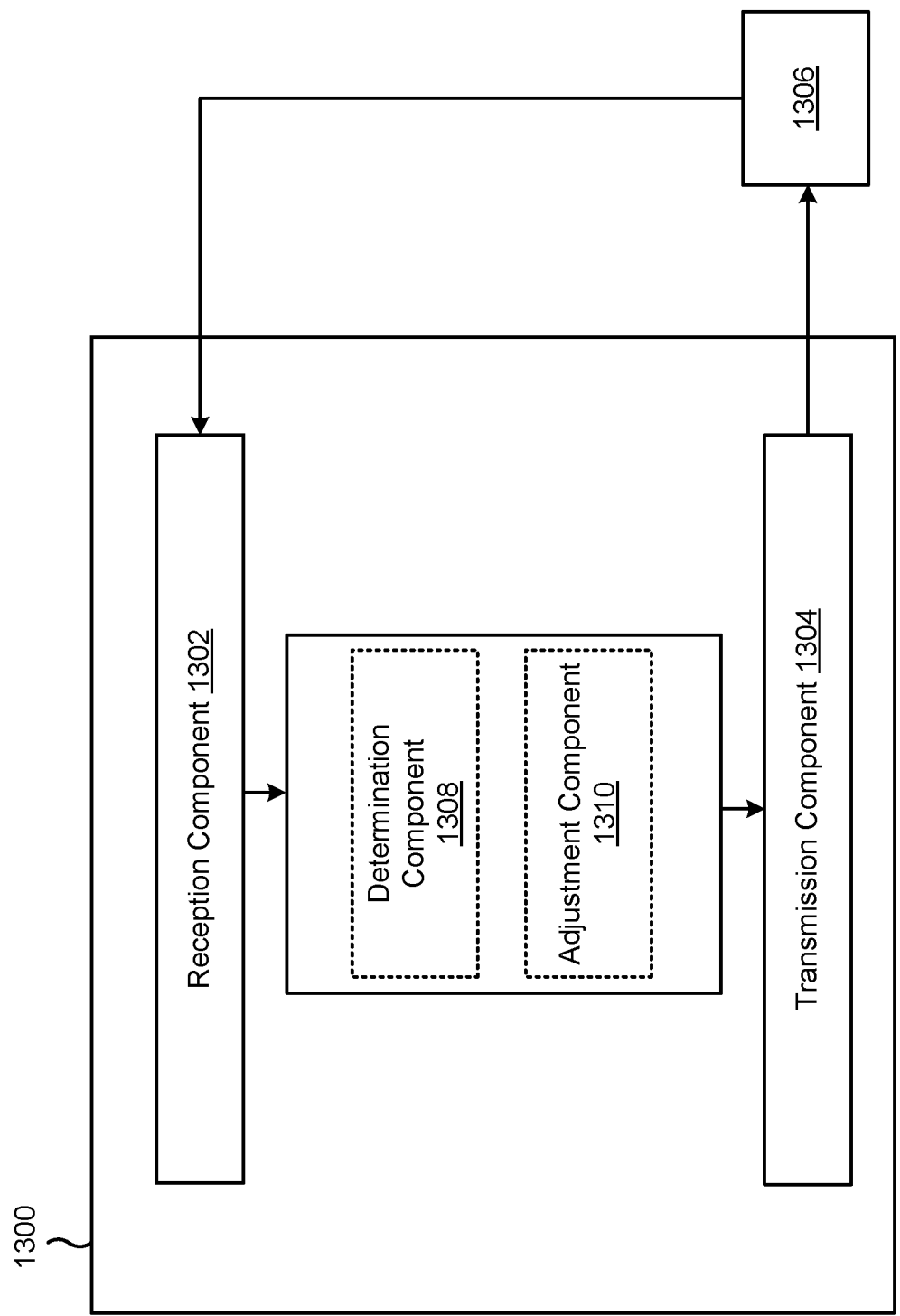
FIGS. 13-14 are block diagrams of example apparatuses for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of a determination component 1308 or an adjustment component 1310, among other examples.

In some aspects, the apparatus 1300 may be configured to perform one or more operations described herein in connection with FIGS. 5-9. Additionally, or alternatively, the apparatus 1300 may be configured to perform one or more processes described herein, such as process 1000 of FIG. 10, or a combination thereof. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive a grant that schedules multiple downlink communications, wherein the grant includes multiple SLIVs that indicate respective TDRAs for the multiple downlink communications and a feedback timing indicator that indicates timing of uplink feedback communications for the multiple downlink communications. The determination component 1308 may determine, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications. The adjustment component 1310 may adjust at least one of the TDRA for the second downlink communication or the timing of the first uplink feedback communication based at least in part on determining that there is a conflict between the timing of the first uplink feedback communication and the TDRA for the second downlink communication.

The reception component 1302 may receive the second downlink communication in the adjusted TDRA for the second downlink communication.

The transmission component 1304 may transmit the first uplink feedback communication in the gap.

The transmission component 1304 may transmit, to a base station, an indication of a capability of the UE.

The reception component 1302 may receive, from a base station, a configuration of the downlink to uplink switching gap.

The reception component 1302 may receive, from a base station, a configuration of the uplink to downlink switching gap.

The reception component 1302 may receive a first transmission of the second downlink communication in the third subset of symbols.

The reception component 1302 may receive a second transmission of the second downlink communication in the fifth subset of symbols.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
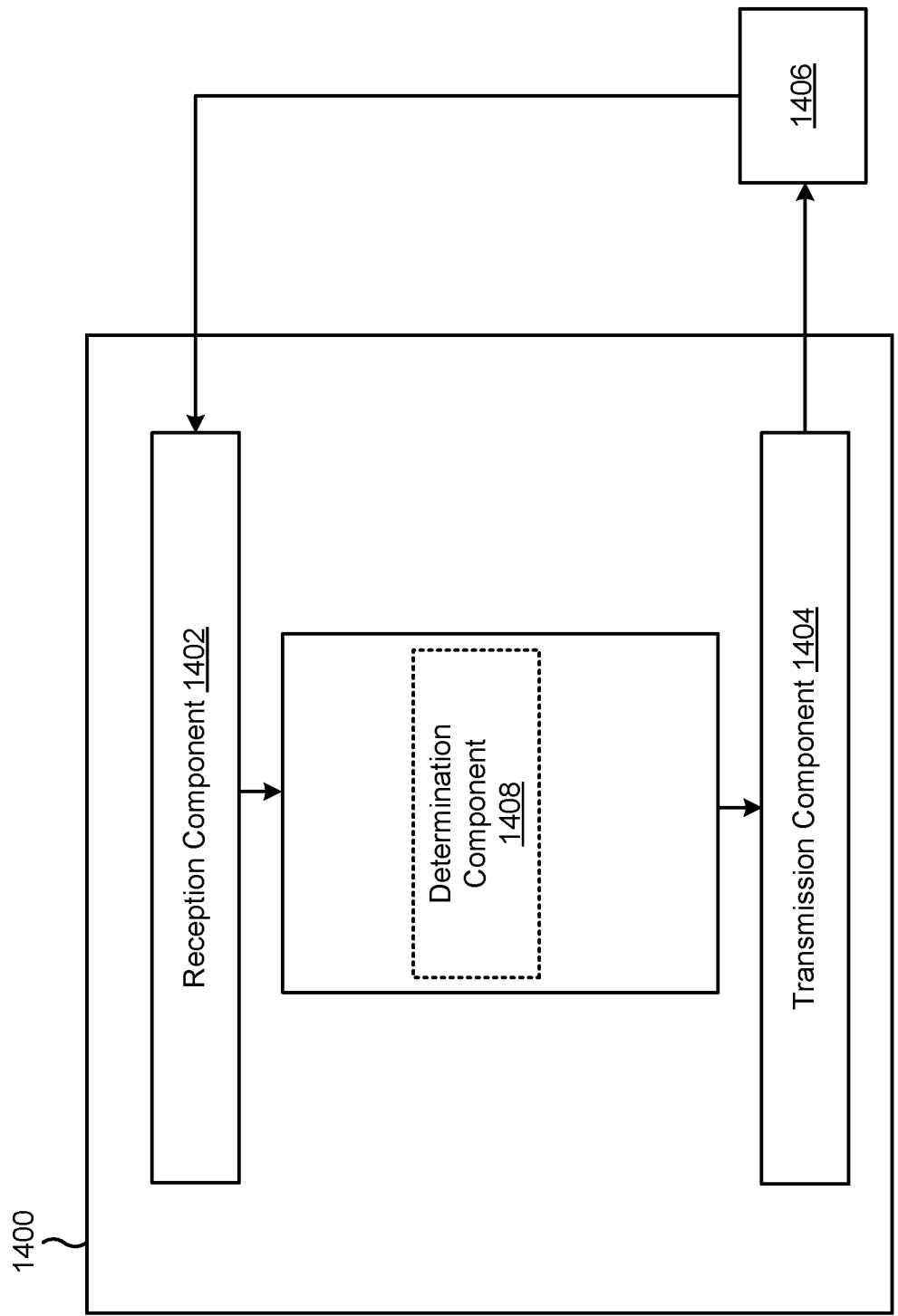

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a determination component 1408, among other examples.

In some aspects, the apparatus 1400 may be configured to perform one or more operations described herein in connection with FIGS. 5-9. Additionally, or alternatively, the apparatus 1400 may be configured to perform one or more processes described herein, such as process 1100 of FIG. 11, process 1200 of FIG. 12, or a combination thereof. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The transmission component 1404 may transmit, to a UE, a grant that schedules multiple downlink communications, wherein the grant includes multiple SLIVs that indicate TDRAs for the multiple downlink communications and a feedback timing indicator that indicates timing of uplink feedback communications for the multiple downlink communications. The determination component 1408 may determine, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications. The transmission component 1404 may transmit, to the UE, the second downlink communication in an adjusted TDRA based at least in part on determining that there is a conflict between the timing of the first uplink feedback communication and the TDRA for the second downlink communication.

The reception component 1402 may receive the first uplink feedback communication in the gap.

The reception component 1402 may receive, from the UE, an indication of a capability of the UE.

The determination component 1408 may determine, based at least in part on the capability of the UE, the downlink to uplink switching gap.

The transmission component 1404 may transmit, to the UE, a configuration of the downlink to uplink switching gap.

The determination component 1408 may determine, based at least in part on the capability of the UE, the uplink to downlink switching gap.

The transmission component 1404 may transmit, to the UE, a configuration of the uplink to downlink switching gap.

The determination component 1408 may determine SLIVs to configure a TDRA for transmitting multiple downlink communications in respective slots of a plurality of slots, wherein the TDRA leaves a gap comprising one or more symbols at an end of each slot in the plurality of slots. The determination component 1408 may determine a feedback offset timing indicator to configure an uplink feedback communication for one or more of the multiple downlink communications to be scheduled in the gap at the end of a slot in the plurality of slots. The transmission component 1404 may transmit, to a UE, a grant that schedules the multiple downlink communications, wherein the grant includes the SLIVs and the feedback offset timing indicator.

The transmission component 1404 may transmit, to the UE, the multiple downlink communications in the respective slots of the plurality of slots based at least in part on the TDRA for the multiple downlink communications.

The reception component 1402 may receive, from the UE, the respective uplink feedback communication for each downlink communication of the multiple downlink communications in the gap at the end of a subsequent slot to the respective slot in which the downlink communication is transmitted, based at least in part on the feedback offset timing indicator.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving a grant that schedules multiple downlink communications, wherein the grant includes multiple start and length indicator values (SLIVs) that indicate respective time domain resource allocations (TDRAs) for the multiple downlink communications and a feedback timing indicator that indicates timing of uplink feedback communications for the multiple downlink communications; determining, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and adjusting at least one of the TDRA for the second downlink communication or the timing of the first uplink feedback communication based at least in part on determining that there is a conflict between the timing of the first uplink feedback communication and the TDRA for the second downlink communication.

Aspect 2: The method of Aspect 1, wherein the downlink communications are physical downlink shared channel (PDSCH) communications, and the grant is included in downlink control information.

Aspect 3: The method of any of Aspects 1-2, wherein the feedback timing indicator indicates a time offset between a downlink communication of the multiple downlink communications and a physical uplink control channel (PUCCH) resource for an uplink feedback communication.

Aspect 4: The method of any of Aspects 1-3, wherein adjusting at least one of the TDRA for the second downlink communication or the timing of the first uplink feedback communication comprises: adjusting the TDRA for the second downlink communication, based at least in part on the timing of the first uplink feedback communication, to determine an adjusted TDRA for the second downlink communication and a gap for the first uplink feedback communication.

Aspect 5: The method of Aspect 4, further comprising: receiving the second downlink communication in the adjusted TDRA for the second downlink communication; and transmitting the first uplink feedback communication in the gap.

Aspect 6: The method of any of Aspects 4-5, wherein the gap includes a first subset of symbols for transmitting the first uplink feedback communication and a second subset of symbols preceding the first subset of symbols to provide a downlink to uplink switching gap, and wherein the adjusted TDRA includes a third subset of symbols preceding the second subset of symbols in the TDRA for the second downlink communication.

Aspect 7: The method of Aspect 6, wherein the downlink to uplink switching gap is based at least in part on a capability of the UE, and further comprising: transmitting, to a base station, an indication of the capability of the UE; and receiving, from the base station, a configuration of the downlink to uplink switching gap.

Aspect 8: The method of any of Aspects 6-7, wherein the gap further includes a fourth subset of symbols subsequent to the first subset of symbols in the TDRA for the second downlink communication.

Aspect 9: The method of any of Aspects 6-7, wherein the gap further includes a fourth subset of symbols subsequent to the first subset of symbols to provide an uplink to downlink switching gap, and wherein the adjusted TDRA further includes a fifth subset of symbols subsequent to the fourth subset of symbols in the TDRA for the second downlink communication.

Aspect 10: The method of Aspect 9, wherein the uplink to downlink switching gap is based at least in part on a capability of the UE, and further comprising: transmitting, to a base station, an indication of the capability of the UE; and receiving, from the base station, a configuration of the uplink to downlink switching gap.

Aspect 11: The method of any of Aspects 9-10, further comprising: receiving a first transmission of the second downlink communication in the third subset of symbols; and receiving a second transmission of the second downlink communication in the fifth subset of symbols.

Aspect 12: The method of Aspect 11, wherein the third subset of symbols includes two or more symbols, and wherein the fifth subset of symbols includes two or more symbols.

Aspect 13: The method of any of Aspects 1-3, wherein adjusting at least one of the TDRA for the second downlink communication or the timing of the first uplink feedback communication comprises: adjusting the timing of the first uplink feedback communication from a first subset of symbols in the TDRA for the second downlink communication to a second subset of symbols at an end of the TDRA for the second downlink communication; and adjusting the TDRA for the second downlink communication to determine an adjusted TDRA that excludes the second subset of symbols at the end of the TDRA for the second downlink communication.

Aspect 14: The method of Aspect 13, wherein the second subset of symbols includes one or more symbols for transmitting the first uplink feedback communication and a downlink to uplink switching gap preceding the one or more symbols for transmitting the first uplink feedback communication, and wherein the adjusted TDRA includes symbols preceding the downlink to uplink switching gap in the TDRA for the second downlink communication.

Aspect 15: A method of wireless communication performed by a base station, comprising: transmitting, to a user equipment (UE), a grant that schedules multiple downlink communications, wherein the grant includes multiple start and length indicator values (SLIVs) that indicate respective time domain resource allocations (TDRAs) for the multiple downlink communications and a feedback timing indicator that indicates timing of uplink feedback communications for the multiple downlink communications; determining, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and transmitting, to the UE, the second downlink communication in an adjusted TDRA based at least in part on determining that there is a conflict between the timing of the first uplink feedback communication and the TDRA for the second downlink communication.

Aspect 16: The method of Aspect 15, wherein the downlink communications are physical downlink shared channel (PDSCH) communications and the grant is included in downlink control information, and wherein the feedback timing indicator indicates a time offset between a downlink communication of the multiple downlink communications and a physical uplink control channel (PUCCH) resource for an uplink feedback communication.

Aspect 17: The method of any of Aspects 15-16, wherein the TDRA for the second downlink communication is adjusted based at least in part on the timing of the first uplink feedback communication, to determine the adjusted TDRA for the second downlink communication and a gap for the first uplink feedback communication.

Aspect 18: The method of Aspect 17, further comprising: receiving the first uplink feedback communication in the gap.

Aspect 19: The method of any of Aspects 17-18, wherein the gap includes a first subset of symbols for transmitting the first uplink feedback communication and a second subset of symbols preceding the first subset of symbols to provide a downlink to uplink switching gap, and wherein the adjusted TDRA includes a third subset of symbols preceding the second subset of symbols in the TDRA for the second downlink communication.

Aspect 20: The method of Aspect 19, further comprising: receiving, from the UE, an indication of a capability of the UE; determining, based at least in part on the capability of the UE, the downlink to uplink switching gap; and transmitting, to the UE, a configuration of the downlink to uplink switching gap.

Aspect 21: The method of any of Aspects 19-20, wherein the gap further includes a fourth subset of symbols subsequent to the first subset of symbols in the TDRA for the second downlink communication.

Aspect 22: The method of any of Aspects 19-20, wherein the gap further includes a fourth subset of symbols subsequent to the first subset of symbols to provide an uplink to downlink switching gap, and wherein the adjusted TDRA further includes a fifth subset of symbols subsequent to the fourth subset of symbols in the TDRA for the second downlink communication.

Aspect 23: The method of Aspect 22, further comprising: receiving, from the UE, an indication of a capability of the UE; determining, based at least in part on the capability of the UE, the uplink to downlink switching gap; and transmitting, to the UE, a configuration of the uplink to downlink switching gap.

Aspect 24: The method of any of Aspects 22-23, wherein transmitting the second downlink communication in the adjusted TDRA comprises: transmitting, to the UE, a first transmission of the second downlink communication in the third subset of symbols; and transmitting, to the UE, a second transmission of the second downlink communication in the fifth subset of symbols.

Aspect 25: The method of any of Aspects 15-16, wherein the timing of the first uplink feedback communication is adjusted from a first subset of symbols in the TDRA for the second downlink communication to a second subset of symbols at an end of the TDRA for the second downlink communication, and wherein the adjusted TDRA excludes the second subset of symbols at the end of the TDRA for the second downlink communication.

Aspect 26: The method of Aspect 25, wherein the second subset of symbols includes one or more symbols for transmitting the first uplink feedback communication and a downlink to uplink switching gap preceding the one or more symbols for transmitting the first uplink feedback communication, and wherein the adjusted TDRA includes symbols preceding the downlink to uplink switching gap in the TDRA for the second downlink communication.

Aspect 27: A method of wireless communication performed by a base station, comprising: determining start and length indicator values (SLIVs) to configure a time domain resource allocation (TDRA) for transmitting multiple downlink communications in respective slots of a plurality of slots, wherein the TDRA leaves a gap comprising one or more symbols at an end of each slot in the plurality of slots; determining a feedback offset timing indicator to configure an uplink feedback communication for one or more of the multiple downlink communications to be scheduled in the gap at the end of a slot in the plurality of slots; and transmitting, to a user equipment (UE), a grant that schedules the multiple downlink communications, wherein the grant includes the SLIVs and the feedback offset timing indicator.

Aspect 28: The method of Aspect 27, wherein the one or more symbols at the end of each slot includes one or more symbols for transmitting an uplink feedback communication and a downlink to uplink switching gap preceding the one or more symbols for transmitting the uplink feedback communication.

Aspect 29: The method of any of Aspects 27-28, further comprising: transmitting, to the UE, the multiple downlink communications in the respective slots of the plurality of slots based at least in part on the TDRA for the multiple downlink communications; and receiving, from the UE, the respective uplink feedback communication for each downlink communication of the multiple downlink communications in the gap at the end of a subsequent slot to the respective slot in which the downlink communication is transmitted, based at least in part on the feedback offset timing indicator.

Aspect 30: An apparatus for wireless communication at a device, comprising a processor; memory coupled with the processor; and instructions stored in the memory and executable by the processor to cause the apparatus to perform the method of one or more of Aspects 1-14.

Aspect 31: A device for wireless communication, comprising a memory and one or more processors coupled to the memory, the one or more processors configured to perform the method of one or more of Aspects 1-14.

Aspect 32: An apparatus for wireless communication, comprising at least one means for performing the method of one or more of Aspects 1-14.

Aspect 33: A non-transitory computer-readable medium storing code for wireless communication, the code comprising instructions executable by a processor to perform the method of one or more of Aspects 1-14.

Aspect 34: A non-transitory computer-readable medium storing a set of instructions for wireless communication, the set of instructions comprising one or more instructions that, when executed by one or more processors of a device, cause the device to perform the method of one or more of Aspects 1-14.

Aspect 35: An apparatus for wireless communication at a device, comprising a processor; memory coupled with the processor; and instructions stored in the memory and executable by the processor to cause the apparatus to perform the method of one or more of Aspects 15-26.

Aspect 36: A device for wireless communication, comprising a memory and one or more processors coupled to the memory, the one or more processors configured to perform the method of one or more of Aspects 15-26.

Aspect 37: An apparatus for wireless communication, comprising at least one means for performing the method of one or more of Aspects 15-26.

Aspect 38: A non-transitory computer-readable medium storing code for wireless communication, the code comprising instructions executable by a processor to perform the method of one or more of Aspects 15-26.

Aspect 39: A non-transitory computer-readable medium storing a set of instructions for wireless communication, the set of instructions comprising one or more instructions that, when executed by one or more processors of a device, cause the device to perform the method of one or more of Aspects 15-26.

Aspect 40: An apparatus for wireless communication at a device, comprising a processor; memory coupled with the processor; and instructions stored in the memory and executable by the processor to cause the apparatus to perform the method of one or more of Aspects 27-29.

Aspect 41: A device for wireless communication, comprising a memory and one or more processors coupled to the memory, the one or more processors configured to perform the method of one or more of Aspects 27-29.

Aspect 42: An apparatus for wireless communication, comprising at least one means for performing the method of one or more of Aspects 27-29.

Aspect 43: A non-transitory computer-readable medium storing code for wireless communication, the code comprising instructions executable by a processor to perform the method of one or more of Aspects 27-29.

Aspect 44: A non-transitory computer-readable medium storing a set of instructions for wireless communication, the set of instructions comprising one or more instructions that, when executed by one or more processors of a device, cause the device to perform the method of one or more of Aspects 27-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors coupled to the memory, the one or more processors configured to:
    receive a grant that schedules multiple downlink communications, wherein the grant includes multiple start and length indicator values (SLIVs) that indicate respective time domain resource allocations (TDRAs) for the multiple downlink communications and a feedback timing indicator that indicates timing of uplink feedback communications for the multiple downlink communications;
    determine, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and
    adjust at least one of the TDRA for the second downlink communication or the timing of the first uplink feedback communication based at least in part on the timing of the first uplink feedback communication, to determine an adjusted TDRA for the second downlink communication and a gap for the first uplink feedback communication and on determining that there is a conflict between the timing of the first uplink feedback communication and the TDRA for the second downlink communication.

2. The UE of claim 1, wherein the one or more processors are further configured to:
    receive the second downlink communication in the adjusted TDRA for the second downlink communication; and
    transmit the first uplink feedback communication in the gap.

3. The UE of claim 1, wherein the gap includes a first subset of symbols for transmitting the first uplink feedback communication and a second subset of symbols preceding the first subset of symbols to provide a downlink to uplink switching gap, and wherein the adjusted TDRA includes a third subset of symbols preceding the second subset of symbols in the TDRA for the second downlink communication.

4. The UE of claim 3, wherein the downlink to uplink switching gap is based at least in part on a capability of the UE, and the one or more processors are further configured to:
    transmit, to a base station, an indication of the capability of the UE; and
    receive, from the base station, a configuration of the downlink to uplink switching gap.

5. The UE of claim 3, wherein the gap further includes a fourth subset of symbols subsequent to the first subset of symbols in the TDRA for the second downlink communication.

6. The UE of claim 3, wherein the gap further includes a fourth subset of symbols subsequent to the first subset of symbols to provide an uplink to downlink switching gap, and wherein the adjusted TDRA further includes a fifth subset of symbols subsequent to the fourth subset of symbols in the TDRA for the second downlink communication.

7. The UE of claim 6, wherein the uplink to downlink switching gap is based at least in part on a capability of the UE, and the one or more processors are further configured to:
transmit, to a base station, an indication of the capability of the UE; and
receive, from the base station, a configuration of the uplink to downlink switching gap.

8. The UE of claim 6, wherein the one or more processors are further configured to:
receive a first transmission of the second downlink communication in the third subset of symbols; and
receive a second transmission of the second downlink communication in the fifth subset of symbols.

9. The UE of claim 1, wherein the one or more processors, to adjust at least one of the TDRA for the second downlink communication or the timing of the first uplink feedback communication, are configured to:
adjust the timing of the first uplink feedback communication from a first subset of symbols in the TDRA for the second downlink communication to a second subset of symbols at an end of the TDRA for the second downlink communication; and
adjust the TDRA for the second downlink communication to determine an adjusted TDRA that excludes the second subset of symbols at the end of the TDRA for the second downlink communication.

10. The UE of claim 9, wherein the second subset of symbols includes one or more symbols for transmitting the first uplink feedback communication and a downlink to uplink switching gap preceding the one or more symbols for transmitting the first uplink feedback communication, and wherein the adjusted TDRA includes symbols preceding the downlink to uplink switching gap in the TDRA for the second downlink communication.

11. A base station for wireless communication, comprising:
a memory; and
one or more processors coupled to the memory, the one or more processors configured to:
transmit, to a user equipment (UE), a grant that schedules multiple downlink communications, wherein the grant includes multiple start and length indicator values (SLIVs) that indicate respective time domain resource allocations (TDRAs) for the multiple downlink communications and a feedback timing indicator that indicates timing of uplink feedback communications for the multiple downlink communications;
determine, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and
transmit, to the UE, the second downlink communication in an adjusted TDRA based at least in part on determining that there is a conflict between the timing of the first uplink feedback communication and the TDRA for the second downlink communication.

12. The base station of claim 11, wherein the TDRA for the second downlink communication is adjusted based at least in part on the timing of the first uplink feedback communication, to determine the adjusted TDRA for the second downlink communication and a gap for the first uplink feedback communication.

13. The base station of claim 12, wherein the one or more processors are further configured to:
receive the first uplink feedback communication in the gap.

14. The base station of claim 12, wherein the gap includes a first subset of symbols for transmitting the first uplink feedback communication and a second subset of symbols preceding the first subset of symbols to provide a downlink to uplink switching gap, and wherein the adjusted TDRA includes a third subset of symbols preceding the second subset of symbols in the TDRA for the second downlink communication.

15. The base station of claim 14, wherein the one or more processors are further configured to:
receive, from the UE, an indication of a capability of the UE;
determine, based at least in part on the capability of the UE, the downlink to uplink switching gap; and
transmit, to the UE, a configuration of the downlink to uplink switching gap.

16. The base station of claim 14, wherein the gap further includes a fourth subset of symbols subsequent to the first subset of symbols in the TDRA for the second downlink communication.

17. The base station of claim 14, wherein the gap further includes a fourth subset of symbols subsequent to the first subset of symbols to provide an uplink to downlink switching gap, and wherein the adjusted TDRA further includes a fifth subset of symbols subsequent to the fourth subset of symbols in the TDRA for the second downlink communication.

18. The base station of claim 17, wherein the one or more processors are further configured to:
receive, from the UE, an indication of a capability of the UE;
determine, based at least in part on the capability of the UE, the uplink to downlink switching gap; and
transmit, to the UE, a configuration of the uplink to downlink switching gap.

19. The base station of claim 17, wherein the one or more processors, to transmit the second downlink communication in the adjusted TDRA, are configured to:
transmit, to the UE, a first transmission of the second downlink communication in the third subset of symbols; and
transmit, to the UE, a second transmission of the second downlink communication in the fifth subset of symbols.

20. The base station of claim 11, wherein the timing of the first uplink feedback communication is adjusted from a first subset of symbols in the TDRA for the second downlink communication to a second subset of symbols at an end of the TDRA for the second downlink communication, and wherein the adjusted TDRA excludes the second subset of symbols at the end of the TDRA for the second downlink communication.

21. The base station of claim 20, wherein the second subset of symbols includes one or more symbols for transmitting the first uplink feedback communication and a downlink to uplink switching gap preceding the one or more symbols for transmitting the first uplink feedback communication, and wherein the adjusted TDRA includes symbols preceding the downlink to uplink switching gap in the TDRA for the second downlink communication.

22. A method of wireless communication performed by a user equipment (UE), comprising:

receiving a grant that schedules multiple downlink communications, wherein the grant includes multiple start and length indicator values (SLIVs) that indicate respective time domain resource allocations (TDRAs) for the multiple downlink communications and a feedback timing indicator that indicates timing of uplink feedback communications for the multiple downlink communications;

determining, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and adjusting at least one of the TDRA for the second downlink communication or the timing of the first uplink feedback communication based at least in part on the timing of the first uplink feedback communication, to determine an adjusted TDRA for the second downlink communication and a gap for the first uplink feedback communication and based at least in part on determining that there is a conflict between the timing of the first uplink feedback communication and the TDRA for the second downlink communication.

23. The method of claim 22,
wherein the gap includes a first subset of symbols for transmitting the first uplink feedback communication and a second subset of symbols preceding the first subset of symbols to provide a downlink to uplink switching gap, and wherein the adjusted TDRA includes a third subset of symbols preceding the second subset of symbols in the TDRA for the second downlink communication.

24. The method of claim 23, wherein the gap further includes a fourth subset of symbols subsequent to the first subset of symbols in the TDRA for the second downlink communication.

25. The method of claim 23, wherein the gap further includes a fourth subset of symbols subsequent to the first subset of symbols to provide an uplink to downlink switching gap, and wherein the adjusted TDRA further includes a fifth subset of symbols subsequent to the fourth subset of symbols in the TDRA for the second downlink communication.

26. The method of claim 22, wherein adjusting at least one of the TDRA for the second downlink communication or the timing of the first uplink feedback communication comprises:

adjusting the timing of the first uplink feedback communication from a first subset of symbols in the TDRA for the second downlink communication to a second subset of symbols at an end of the TDRA for the second downlink communication, wherein the second subset of symbols includes one or more symbols for transmitting the first uplink feedback communication and a downlink to uplink switching gap preceding the one or more symbols for transmitting the first uplink feedback communication; and adjusting the TDRA for the second downlink communication to determine an adjusted TDRA that excludes the second subset of symbols at the end of the TDRA for the second downlink communication, wherein the adjusted TDRA includes symbols preceding the downlink to uplink switching gap in the TDRA for the second downlink communication.

27. A method of wireless communication performed by a base station, comprising:

transmitting, to a user equipment (UE), a grant that schedules multiple downlink communications, wherein the grant includes multiple start and length indicator values (SLIVs) that indicate respective time domain resource allocations (TDRAs) for the multiple downlink communications and a feedback timing indicator that indicates timing of uplink feedback communications for the multiple downlink communications;

determining, based at least in part on the SLIVs and the feedback timing indicator, that there is a conflict between a timing of a first uplink feedback communication for at least one first downlink communication of the multiple downlink communications and a TDRA for a second downlink communication of the multiple downlink communications; and transmitting, to the UE, the second downlink communication in an adjusted TDRA based at least in part on determining that there is a conflict between the timing of the first uplink feedback communication and the TDRA for the second downlink communication.

28. The method of claim 27, wherein the TDRA for the second downlink communication is adjusted based at least in part on the timing of the first uplink feedback communication, to determine the adjusted TDRA for the second downlink communication and a gap for the first uplink feedback communication, wherein the gap includes a first subset of symbols for transmitting the first uplink feedback communication and a second subset of symbols preceding the first subset of symbols to provide a downlink to uplink switching gap, and wherein the adjusted TDRA includes a third subset of symbols preceding the second subset of symbols in the TDRA for the second downlink communication.

29. The method of claim 27, wherein the timing of the first uplink feedback communication is adjusted from a first subset of symbols in the TDRA for the second downlink communication to a second subset of symbols at an end of the TDRA for the second downlink communication, and wherein the adjusted TDRA excludes the second subset of symbols at the end of the TDRA for the second downlink communication.

* * * * *